US010671936B2

(12) United States Patent
Bouveyron et al.

(10) Patent No.: US 10,671,936 B2
(45) Date of Patent: Jun. 2, 2020

(54) METHOD FOR CLUSTERING NODES OF A TEXTUAL NETWORK TAKING INTO ACCOUNT TEXTUAL CONTENT, COMPUTER-READABLE STORAGE DEVICE AND SYSTEM IMPLEMENTING SAID METHOD

(71) Applicants: Universite Paris Descartes, Paris (FR); Universite Paris 1 Pantheon-Sorbonne, Paris (FR); Centre National de la Recherche Scientifique (CNRS), Paris (FR)

(72) Inventors: Charles Bouveyron, Paris (FR); Pierre Latouche, Fontainebleau (FR)

(73) Assignees: Universite Paris Descartes (FR); Universite Paris I Pantheon-Sorbonne (FR); Centre National de la Recherche Scientifique (CNRS) (FR)

( * ) Notice: Subject to any disclaimer, the term of this patent is extended or adjusted under 35 U.S.C. 154(b) by 607 days.

(21) Appl. No.: 15/480,948

(22) Filed: Apr. 6, 2017

(65) Prior Publication Data
US 2018/0293505 A1 Oct. 11, 2018

(51) Int. Cl.
*G06N 7/00* (2006.01)
*H04L 12/24* (2006.01)
*G06N 5/00* (2006.01)

(52) U.S. Cl.
CPC .......... *G06N 7/005* (2013.01); *G06N 5/003* (2013.01); *H04L 41/0893* (2013.01); *H04L 41/16* (2013.01)

(58) Field of Classification Search
CPC .... G06N 7/005; G06N 5/003; H04L 41/0893; H04L 41/16
See application file for complete search history.

(56) References Cited

U.S. PATENT DOCUMENTS 8,285,719 B1 * 10/2012 Long .................. G06N 7/005
707/737
8,630,975 B1 * 1/2014 Guo .................. G06N 7/005
707/608

(Continued)

OTHER PUBLICATIONS

Etienne Comme et al., "Model selection and clustering in stochastic block models with exact integrated complete data likelihood", Cornell University, 2014 [found online at: https://arxiv.org/abs/1303.2962v2] (Year: 2014).*

(Continued)

*Primary Examiner* — Alexey Shmatov
*Assistant Examiner* — Beatriz Ramirez Bravo
(74) *Attorney, Agent, or Firm* — Lerner, David, Littenberg, Krumholz & Mentlik, LLP

(57) ABSTRACT

The invention relates to a method for clustering nodes of a network, the network comprising nodes associated with message edges of text data, the method comprising an initialization step of determination of a first initial clustering of the nodes, and a step of iterative inference of a generative model of text documents. Edges are modeled with a Stochastic Block Model (SBM) and the sets of documents between and within clusters are modeled according to a generative model of documents. The inference step comprises iteratively modelling the text documents and the underlying topics of their textual content, and updating the clustering as a function of the modelling, until a convergence criterion is fulfilled and an optimized clustering and corresponding optimized values of the parameters of the models are output.

25 Claims, 23 Drawing Sheets
(14 of 23 Drawing Sheet(s) Filed in Color)

(56) References Cited

U.S. PATENT DOCUMENTS

| | | | |
|---|---|---|---|
| 2010/0076913 A1* | 3/2010 | Yang | G06N 7/005 706/13 |
| 2017/0092143 A1* | 3/2017 | Brennan | G09B 7/00 |
| 2018/0253485 A1* | 9/2018 | Pappu | H04L 67/22 |

OTHER PUBLICATIONS

P. Latouche et al., "Variational Bayesian inference and complexity control for stochastic block models", 2010 [found online at: https://arxiv.org/abs/0912.2873] (Year: 2010).*

Biernacki et al., "Choosing starting values for the EM algorithm for getting the highest likelihood in multivariate Gaussian mixture models", Computational Statistics & Data Analysis, vol. 41, Issue 3-4, pp. 561-575, Jan. 2003.

Biernacki et al., "Assessing a mixture model for clustering with the integrated completed likelihood", IEEE Trans. Pattern Anal. Mach. Intel., vol. 22, Issue 7, pp. 719-725, Jul. 2000.

Bilmes, "A gentle tutorial of the EM algorithm and its application to parameter estimation for Gaussian mixture and hidden Markov models", Int. Comput. Sci. Inst., 4(510), p. 126, Apr. 1998.

Blei et al., "Latent Dirichlet allocation", Journal of Machine Learning Research, vol. 3, pp. 993-1022, Jan. 2003.

Blondel et al., Fast unfolding of communities in large networks. Journal of Statistical Mechanics: Theory and Experiment, vol. 10, pp. 10008-10020, Oct. 2008.

Côme et al., "Model selection and clustering in stochastic block models with the exact integrated complete data likelihood", Statistical Modelling, vol. 15, No. 6, pp. 564-589, Dec. 2015.

Daudin et al., "A mixture model for random graphs", Statistics and Computing, vol. 18, Issue 2, pp. 173-183, Jun. 2008.

Hoff et al., "Latent space approaches to social network analysis", Journal of the American Statistical Association, vol. 97, No. 460, pp. 1090-1098, Dec. 2002.

Hofman et al., "Bayesian approach to network modularity", Physical Review Letters, vol. 100, No. 25, pp. 258701-1-258701-4, Jun. 2008.

Hofmann et al., "Probabilistic latent semantic indexing", proceedings of the 22nd annual international ACM SIGIR conference on research and development in information retrieval, pp. 50-57, ACM, Aug. 1999.

Leroux, "Consistent estimation of a mixing distribution", Annals of Statistics, vol. 20, No. 3, pp. 1350-1360, Sep. 1992.

Liu et al., "Topic-link LDA: joint models of topic and author community", In Proceedings of the 26th annual international conference on machine learning, pp. 665-672. ACM, Montreal, Quebec, Canada, Jun. 14-18, 2009.

McCallum et al., "The author-recipient-topic model for topic and role discovery in social networks, with application to Enron and academic emails", workshop on link analysis, counterterrorism and security, pp. 33-44, Apr. 2005.

Newman, "Fast algorithm for detecting community structure in networks", Physical Review Letter E, vol. 69, Issue 6, p. 0066133, Jun. 2004.

Nowicki et al., "Estimation and prediction for stochastic blockstructures", Journal of the American Statistical Association, vol. 96, No. 455, pp. 1077-1087, Sep. 2001.

Papadimitriou et al., "Latent semantic indexing: A probabilistic analysis", proceedings of the tenth ACM PODS, pp. 159-168, ACM, Jun. 1998.

Pathak et al., "Social topic models for community extraction", In the 2nd SNA-KDD workshop, vol. 8, Aug. 2008.

Rosen-Zvi et al., "The author-topic model for authors and documents", proceedings of the 20th conference on uncertainty in artificial intelligence, pp. 487-494, AUAI Press, Jul. 2004.

Sachan et al., "Using content and interactions for discovering communities in social networks", In Proceedings of the 21st international conference on World Wide Web, pp. 331-340. ACM, Lyon, France, Apr. 16-20, 2012.

Steyvers et al., "Probabilistic author-topic models for information discovery", proceedings of the tenth ACM SIGKDD international conference on knowledge discovery and data mining, pp. 306-315, ACM, Aug. 2004.

Than et al., "Fully sparse topic models", Machine Learning and Knowledge Discovery in Databases, Lecture Notes in Computer Science. vol. 7523, pp. 490-505, (Sep. 2012).

Zanghi, et al., "Fast online graph clustering via Erdos-Renyi mixture", Pattern Recognition, vol. 41, Issue 12, pp. 3592-3599, Dec. 2008.

* cited by examiner

Table of most specific words for each topic, ranked in descending order of value of $\beta_{kv}$

| v \ k | 1 | 2 | 3 |
|---|---|---|---|
| 1 | | seeds | |
| 2 | | david | |
| 3 | | political | |
| 4 | | kingdom | |
| 5 | | smp | |
| 6 | | united | |
| 7 | | assessment | |
| 8 | | lost | |
| 9 | | government | |
| 10 | | party | |

Table of most specific words for each topic,
ranked in descending order of value of $\beta_{kv}$

| v \ k | 1 | 2 | 3 | 4 | 5 |
|---|---|---|---|---|---|
| 1 | cycla | grigsby | edison | backup | mmbtud |
| 2 | ofo | afghanistan | puc | seat | harris |
| 3 | usage | viewing | interview | test | walson |
| 4 | select | desk | state | location | capacity |
| 5 | prorate | phillip | interviewers | building | transwestern |
| 6 | storage | ground | dwi | supplies | deliveries |
| 7 | interruptible | park | davis | computer | haystell |
| 8 | declared | taleban | fantastic | announcement | master |
| 9 | equal | forces | dinner | notified | lynn |
| 10 | ridge | named | soul | phones | socalgas |
| 11 | forecast | sheppard | saturday | seats | shackleton |
| 12 | windows | fundamental | super | locations | donotio |
| 13 | wheeler | tori | california | regular | lindy |
| 14 | riom | allen | mara | assignments | kay |
| 15 | injections | ermis | dasovich | rely | sara |
| 16 | elapsed | ina | phase | assignment | geacoorie |
| 17 | limits | kuykendall | governor | numbers | pkgs |
| 18 | gas | gaskill | steffes | equipment | juan |
| 19 | receipt | bin | ito | aside | kilmer |
| 20 | clock | heizenrader | contracts | floors | netting |

FIG. 12

STBM

FIG. 15

Table of most specific words for each topic,
ranked in descending order of value of $\beta_{kv}$

| k\v | 1 | 2 | 3 | 4 | 5 | 6 | 7 |
|---|---|---|---|---|---|---|---|
| 1 | synapse | formal | learning | orientation | group | spike | university |
| 2 | neuron | learning | noise | centers | equilibrium | learning | code |
| 3 | analog | phoneme | synapse | models | network | stimulus | rob |
| 4 | noise | dynamic | electronic | map | learning | data | brenner |
| 5 | reinforcement | neuron | supervised | orientations | groups | activity | naftall |
| 6 | gain | threshold | reinforcement | drift | fig | overlap | tishby |
| 7 | earning | functions | stochastic | hubel | feedback | likelihood | van |
| 8 | search | operation | procedure | riders | noise | firing | steveninck |
| 9 | cluster | phonemes | tension | cooler | weight | spikes | israel |
| 10 | wieght | test | fig | weasel | updating | input | motor |

FIG. 19

METHOD FOR CLUSTERING NODES OF A TEXTUAL NETWORK TAKING INTO ACCOUNT TEXTUAL CONTENT, COMPUTER-READABLE STORAGE DEVICE AND SYSTEM IMPLEMENTING SAID METHOD

FIELD OF THE INVENTION

The invention pertains to the field of analysis of networks of nodes associated with texts in electronic form.

Especially, the invention relates to a method for automatically determining clusters of nodes of such a network, the clusters being consistent with both network interactions and textual content.

BACKGROUND OF THE INVENTION

Due to the significant increase of communications between individuals via social media (Facebook, Twitter) or electronic formats (email, web, co-authorship) in the past two decades, network analysis has become an unavoidable discipline.

It is nowadays extremely frequent to represent networks wherein individuals or devices are modelled by nodes, and wherein text data that associate a pair of nodes, such as an email or social network message sent from a sender to a recipient, are modelled by textual edges. Edges can be directed, in said case of an email from a sender to a recipient, or undirected, for instance if a text datum associating two nodes is a co-authored document associating two authors in an undirected manner. It is obviously of strong interest to be able to model and cluster those networks. Applications of network modelling exist in domains ranging from biology (analysis of gene regulation processes) to social sciences (analysis of political blogs) to historical sciences (for representing historical social networks).

Modelling of Networks of Binary Links Represented by Binary Edges

Statistical models for networks are known, which allow to infer clusters based on the existence of links between the nodes. In this context, the nodes can be represented, in a graphical representation of the network, by points, and the links that exist between the nodes (text data associated with a pair of nodes, such as an e-mail between two mail addresses) can be represented by mere binary edges that link the points. For instance, an adjacency matrix $A=(A_{ij})$ can be associated with the network, and doubly indexed with the plurality of nodes of the network. The value $A_{ij}$ is then set to 1 when a link exists between nodes i and j, with a corresponding binary edge between points of nodes i and j being displayed on the graphical representation, and the value $A_{ij}$ is conversely set to 0 when no link exists, which translates on the graphical representation of the network by a lack of an edge between i and j.

Since statistical methods for analysis of networks have emerged about fifteen years ago, with the seminal work of Hoff et al. (2002)[1], said methods have proven themselves as efficient and flexible techniques for network clustering. Most of those methods look for specific structures, so-called communities, which exhibit a transitivity property such that nodes of the same community are more likely to be connected (Hofman and Wiggins, 2008)[2]. An especially popular approach for community discovering operates a stochastic block model (SBM) which is a flexible random graph model. In this model, it is assumed that each vertex (each node) belongs to a latent group, and that the probability of connection between a pair of vertices (existence of an edge) depends exclusively on their respective groups. Because no specific assumption is made on the connection probabilities, various types of structures of vertices can be taken into account. Indeed, the SBM model allows to disclose communities, ie. groups of densely connected nodes wherein each node tends to communicate more with the other nodes than with nodes exterior to the community. But the stochastic block model also allows to disclose other types of subnetworks, such as star-shaped structures wherein one node is frequently linked to a plurality of other nodes that are not necessarily linked frequently to each other, or even disassortative networks, wherein nodes that are dissimilar tend to connect more than nodes that are similar. Use of a stochastic block model to modelize networks has been initiated by Nowicki and Snijders (2001)[3].

However, considering only the network information may not be sufficient in order to obtain meaningful clusters. It is known of the prior art to take into account further information than the mere existence of a link between two nodes, such as the date of the text data that corresponds to a link (temporal edges) or the type of link (categorical edges). It is also known to have the edges weighted by number of links between the nodes, and/or preeminence of certain links over others.

Still, using only network information, without analyzing the corresponding text content, may be misleading in some cases, even with the use of categorized edges mentioned above which are a refinement of binary edges. As a motivating example, FIG. 1—which will be described in greater detail in the detailed description hereinafter—shows a network representation of the type mentioned above, wherein nodes taken from an exemplary textual network scenario which will be described below are clustered into 3 "communities", obtained via a method using a stochastic block model (SBM). However, one of the communities in this exemplary scenario can in fact be split into two separate groups, based on the topics of communication between nodes internal to these two separate groups. A mere method of inference of clusters which does not take into account the topics of discussion between the nodes, while inferring clusters and clustering nodes into them, cannot recover this sub-structure of said group into two separate groups. In this scenario, it would be highly beneficial to obtain a clustering of network vertices that would take into account the content of the textual edges, with a semantic analysis being carried out in order to recover the topics of discussion in order to refine the clustering of the nodes. More generally, using a network analysis method which only relies on detection of binary edges, or refinements of binary edges, the textual content of the text data linking nodes of the network is not exploited whatsoever for finding meaningful clusters.

Semantic Analysis of Text of Documents

Independently from network analysis, statistical modelling of texts has appeared at the end of the last century for semantic analysis of texts, with an early model of latent semantic indexing (LSI) developed by Papadimitriou et al. (1998)[4], allowing to recover linguistic notions such as synonymy and polysemy from term frequency within the text of documents. A first generative model of documents called probabilistic latent semantic indexing (pLSI) has been proposed by Hofmann (1999)[5], wherein each word is generated from a single latent group known as a "topic", and different words in the same document can be generated from different topics with different proportions.

Another model known as latent Dirichlet allocation (LDA) has subsequently been developed by Blei et al.

(2003)[6], which has rapidly become the standard tool in statistical text analytics. The idea of LDA is that documents are represented as random mixtures over latent topics, wherein each topic is characterized by a distribution over words. LDA is therefore similar to pLSI, except that the topic distribution in LDA has a Dirichlet prior. Note that a limitation of LDA would be the inability to take into account possible topic correlations. This is due to the use of the Dirichlet distribution to model the variability among the topic proportions.

Joint Analysis of Network Structure and Content of Textual Links

Moving back to the problem of obtaining a clustering of network vertices that would take into account the content of the textual edges, a few recent works have focused on the joint modelling of texts and networks. Those works are mainly motivated by the will of analyzing social networks, such as Twitter or Facebook, or electronic communication networks. Some of these models have been partially based on a latent Dirichlet allocation (LDA) generative model of textual communications, especially the author-topic (AT) model (Steyvers et al., 2004; Rosen-Zvi et al., 2004)[7] and the author-recipient-topic (ART) (McCallum et al., 2005)[8] models. The AT model extends LDA to include authorship information whereas the ART model includes authorships and information about the recipients. However, said models remain generative models of documents and do not allow to recover a network structure or a clustering of edges bound by text data.

An attempt at a model for joint analysis of text content and networks was made by Pathak et al. (2008)[9] who extended the aforementioned ART model by introducing the community-author-recipient-topic (CART) model. The CART model adds to the ART model that authors and recipients belong to latent communities, and allows CART to recover groups of nodes that are homogenous both regarding the network structure and the message content. The CART model allows the nodes to be part of multiple communities and each couple of actors to have a specific topic. Thus, though extremely flexible, CART is also a highly-parametrized model which comes with an increased computational complexity. In addition, the recommended inference procedure based on Gibbs sampling may also prohibit its application to large networks.

Another model known as topic-link LDA (Liu et al., 2009)[10] also performs topic modeling and author community discovery in a unified framework. Topic-link LDA extends LDA with a community layer; the link between two documents (and consequently its authors) depends on both topic proportions and author latent features. The authors derived an algorithm of the otherwise well-known Variational Expectation-Maximization type (VEM) for inference of the structure, allowing topic-link LDA to eventually be applied to large networks. However, a huge limitation of the topic-link LDA model is that it is only able to deal with undirected networks. Finally, a family of 4 topic-user-community models (TUCM) was described by Sachan et al. (2012)[11]. The TUCM models are designed such that they can find "topic-meaningful" communities in networks with different types of edges. Though, inference is done here through Gibbs sampling, implying a possible limitation as this method can be applied to very limited sets of network data.

Besides, a major drawback of the aforementioned methods for joint analysis of texts and networks is that they are not able to recover a whole range of structures such as communities, but also star-shapes or disassortative clusters, as defined above. Further, to the knowledge of the inventors, a complete implementation of a computer method using topic-link LDA in order to process text data of a network and infer a network structure has never been proposed yet.

Therefore, a need exists for a method for clustering nodes of a textual network, carrying out both network analysis (using information of the existence of text data associating a pair of nodes of the network) and semantic analysis (using information of topics inferred from the text data), and especially taking into account the content of the text data in order to characterize the clusters. Once it is detected that a certain node displays a certain behavior in terms of topics of discussion with other nodes, the needed method should seek to assign said node to a cluster which is consistent with its discussion behavior. This method must be of sufficient flexibility and reasonable computational complexity, must work for both directed and undirected networks, and must be highly interpretable and be able to operate on large-scale networks.

CITED REFERENCES

[1] P. D. Hoff, A. E. Raftery, and M. S. Handcock. Latent space approaches to social network analysis. Journal of the American Statistical Association, 97(460):1090-1098, 2002.

[2] J. M. Hofman and C. H. Wiggins. Bayesian approach to network modularity. Physical review letters, 100 (25): 258701, 2008.

[3] K. Nowicki and T. A .B. Snijders. Estimation and prediction for stochastic blockstructures. Journal of the American Statistical Association, 96(455):1077-1087, 2001.

[4] C. Papadimitriou, P. Raghavan, H. Tamaki, and S. Vempala. Latent semantic indexing: A probabilistic analysis. In Proceedings of the tenth ACM PODS, pages 159-168. ACM, 1998.

[5] T. Hofmann. Probabilistic latent semantic indexing. In Proceedings of the 22nd annual international ACM SIGIR conference on Research and development in information retrieval, pages 50-57. ACM, 1999.

[6] D. M. Blei, A. Y. Ng, and M. I. Jordan. Latent Dirichlet allocation. the Journal of machine Learning research, 3:993-1022, 2003.

[7] M. Steyvers, P. Smyth, M. Rosen-Zvi, and T. Griffiths. Probabilistic author-topic models for information discovery. In Proceedings of the tenth ACM SIGKDD international conference on Knowledge discovery and data mining, pages 306-315. ACM, 2004; M. Rosen-Zvi, T. Griffiths, M. Steyvers, and P. Smyth. The author-topic model for authors and documents. In Proceedings of the 20th conference on Uncertainty in artificial intelligence, pages 487-494. AUAI Press, 2004.

[8] A. McCallum, A. Corrada-Emmanuel, and X. Wang. The author-recipient-topic model for topic and role discovery in social networks, with application to Enron and academic emails. In Workshop on Link Analysis, Counterterrorism and Security, pages 33-44, 2005.

[9] N. Pathak, C. DeLong, A. Banerjee, and K. Erickson. Social topic models for community extraction. In The 2nd SNA-KDD workshop, volume 8. Citeseer, 2008.

[10] Y. Liu, A. Niculescu-Mizil, and W. Gryc. Topic-link LDA: joint models of topic and author community. In Proceedings of the 26th annual international conference on machine learning, pages 665-672. ACM, 2009.

[11] M. Sachan, D. Contractor, T. Faruquie, and L. Subramaniam. Using content and interactions for discovering communities in social networks. In Proceedings of the 21st international conference on World Wide Web, pages 331-340. ACM, 2012.

[12] M. E. J. Newman. Fast algorithm for detecting community structure in networks. Physical Review Letter E, 69:0066133, 2004.

[13] V. D. Blondel, J-L. Guillaume, R. Lambiotte, and E. Lefebvre. Fast unfolding of communities in large networks. Journal of Statistical Mechanics: Theory and Experiment, 10:10008-10020, 2008.

[14] E. Côme and P Latouche. Model selection and clustering in stochastic block models with the exact integrated complete data likelihood. Statistical Modelling, 2015.

[15] H. Zanghi, C. Ambroise, and V. Miele. Fast online graph clustering via Erdos-Renyi mixture. Pattern Recognition, 41:3592-3599, 2008.

[16] B. G. Leroux. Consistent estimation of a mixing distribution. Annals of Statistics, 20:1350-1360, 1992.

[17] J-J. Daudin, F. Picard, and S. Robin. A mixture model for random graphs. Statistics and Computing, 18(2):173-183, 2008.

[18] Biernacki, C., Celeux, G., Govaert, G.: Assessing a mixture model for clustering with the integrated completed likelihood. IEEE Trans. Pattern Anal. Mach. Intel. 7, 719-725 (2000)

[19] Than, K., Ho, T.: Fully sparse topic models. Machine Learning and Knowledge Discovery in Databases, Lecture Notes in Computer Science. vol. 7523, pp. 490-505. Springer, Berlin (2012)

[20] Ambroise, C., Grasseau, G., Hoebeke, M., Latouche, P., Miele, V., Picard, F.: The mixer R package (version 1.8) (2010).

[21] Bilmes, J.: A gentle tutorial of the EM algorithm and its application to parameter estimation for Gaussian mixture and hidden Markov models. Int. Comput. Sci. Inst. 4, 126 (1998)

[22] Biernacki, C., Celeux, G., Govaert, G.: Choosing starting values for the EM algorithm for getting the highest likelihood in multivariate gaussian mixture models. Comput. Stat. Data Anal. 41(3-4), 561-575 (2003)

SUMMARY OF THE INVENTION

In order to overcome the drawbacks of the prior art that are identified above, the Applicant has developed a computer-implemented method which is able to infer clusters of nodes on the basis of sets of text data associating nodes of the network, from both network information—existence of associations between nodes of the network—and semantic information—topics of discussion found within the text data. The proposed modeling is able to exhibit node partitions that are meaningful with regard to both the network structure and the topics, with a model of limited complexity, highly interpretable, and operable for both directed and undirected networks. The clusters that are inferred from such a combined network analysis and semantic analysis will be referred to as "topic-meaningful clusters" in what follows. The method relies on a statistical model initiated by the inventors, that is referred to as stochastic topic-block model (STEM) below, which will be explained in greater detail in the description of a preferred embodiment.

An adjacency matrix, representing the existence of a node-to-node link in the form of text data associated with two nodes, and the textual content of said text data, are taken as an input of a method of the invention. Clustering methods according to the invention include inferential analysis of said input, in order to infer parameters of a STBM model for the textual network that is analyzed. In preferred embodiments, said inference involves use of a classification variational expectation-maximization (C-VEM) algorithm, which has the advantage of allowing inference on large-scale networks.

Said STBM underlying statistical model uses synergy between network analysis based on a stochastic block model (SBM), which offers a sufficient flexibility with a reasonable complexity, and a generative model of the text data observed within the network. The STBM model generalizes both SBM and LDA models in the case of a textual network wherein nodes are linked by text data. Hypotheses are made, which are described below, on joint distributions of the model to create textual links between two nodes in the form of text data, and the corresponding content of the text data.

The main preferred underlying hypotheses when carrying out a method of the invention are the following:
existence or absence of a textual link (ie. text data associating two nodes of the network) between two nodes is only a function of the two clusters (or one single cluster) which the two nodes respectively belong to, which is a known hypothesis for a stochastic block model of a network,
the distribution of words of a given document associated with two nodes, among inferred topics, is also only a function of the two clusters (or one single cluster) which the two nodes respectively belong to.

In other words, two nodes in the same cluster should have the same trend to be associated to others via a textual link, and when said nodes are linked to another node of a network, be it from the same cluster or another cluster, the corresponding text data should contain words related to similar topics.

Statistical parameters of said STBM model can be easily represented for a given network in a highly interpretable way, for example through the graphical representations that will be described below, which include meta-networks of the determined clusters of nodes.

BRIEF DESCRIPTION OF THE DRAWINGS

The patent or application file contains at least one drawing executed in color, Copies of this patent or patent application publication with color drawing(s) will be ,orovided by the Office moon request and payment of the necessary fee.

Other characteristics, objectives and advantages of the invention will become apparent from the following detailed description, which is solely illustrative and non-limiting, and is to be read in connection with FIG. 1 which has already been introduced above, and the other following drawings:

FIG. 8c displays the ten majority words of each topic found by the method of FIG. 3, for the example of FIG. 7.

FIG. 12 displays the twenty majority words of each topic found by the method of FIG. 6, for the same Enron e-mail data set.

FIG. 15 displays, for the Enron data set, a matrix of quality evaluation of several sets of hyper-parameters along which the method of FIG. 6 has been run.

FIG. 19 displays the ten majority words of each topic found by the method of FIG. 6, for the same Nips co-authorship data set.

DETAILED DESCRIPTION OF A PREFERRED EMBODIMENT

Figure 1:
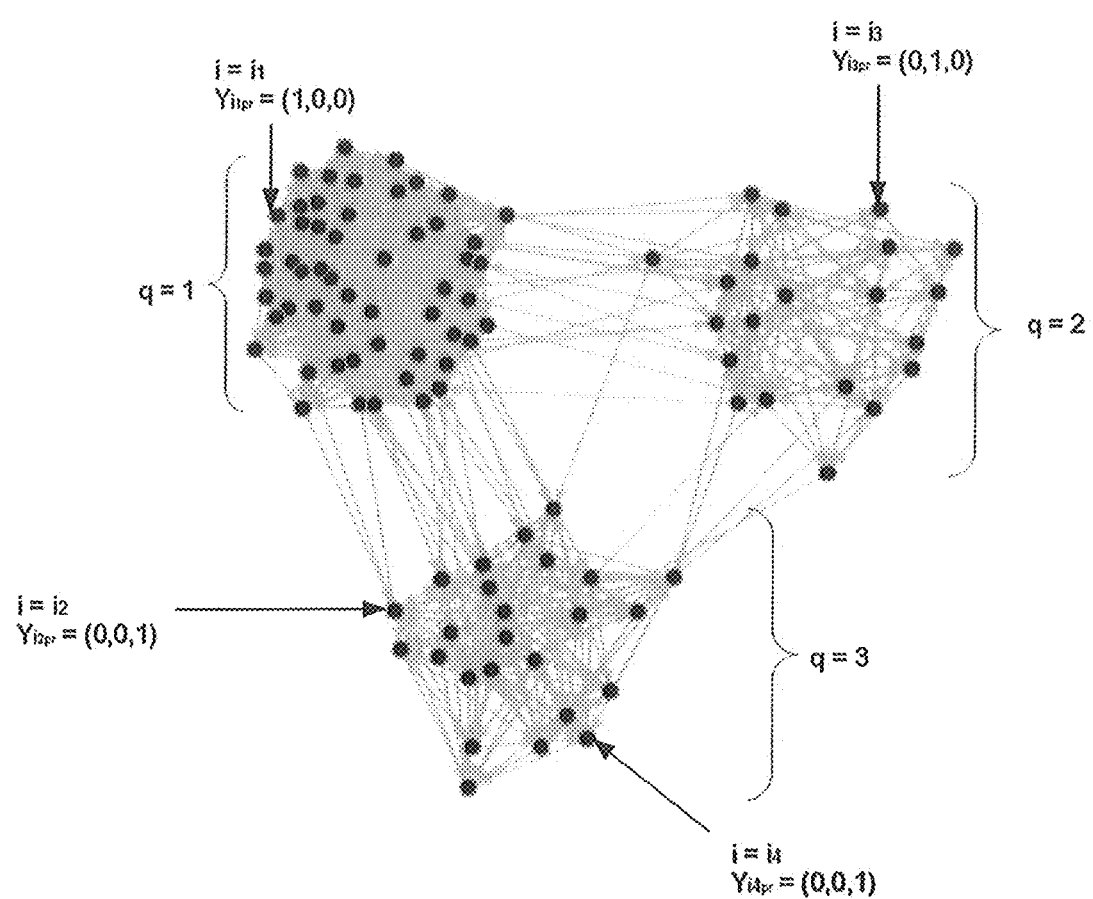

In what follows, a preferred embodiment for a method of the invention is described. This method is run by a server of a computer that can communicate with a database, containing observed network data taken as an input, which will be described below. The disclosed method allows to obtain topic-meaningful clusters and register them in a memory, in the form of associations between indexes of nodes of the network and indexes of found clusters. This method generally relies on statistical inference for a STBM model described below: assuming that a considered textual network has an underlying distribution of node-to-node links, and of corresponding text data, that correspond to a STBM model, the method seeks to deduce topic-meaningful clusters and corresponding topics by inference of the underlying STBM distribution. A method for determining optimized "hyper-parameters"—which correspond to an optimum number $Q^*$ of groups q and an optimum number $K^*$ of clusters k—is also described below, and includes several repetitions of the first method.

We will first introduce the STBM model and introduce the notations for joint distribution of node-to-node links in the form of text data, and the corresponding content of the text data. Said notations will then be used for describing an embodiment of a clustering method, and for describing illustrative examples of use of said method.

Input Network Data

We hereby consider a textual network comprising M nodes, wherein node-to-node links exist in the form of text data. Nodes can also be referred to below as vertices (by analogy with a graphical representation of the textual network, in which a node can be represented by a vertex).

The nodes correspond to entities that are known, such that for a given text datum associating two nodes, the nodes are unambiguously identifiable. For instance, nodes can correspond to individuals, mail or e-mail addresses, companies, devices. The text data are stored in a database, in such a way that the nodes they correspond to are identifiable, and words of the text data are indexed. For each pair of nodes i and j of the network which are associated with text data, i and j being natural numbers for indexing the nodes of the network, a set of text data $W_{ij}=(W_{ij}^1, \ldots, W_{ij}^{D_{ij}})$ is stored, wherein $D_{ij}$ is the number of distinct text documents that are associated with nodes i and j. For the d-th document of said documents, $W_{ij}^d=(W_{ij}^{d1}, \ldots, W_{ij}^{dN_{ij}^d})$ is a vector made of a number $N_{ij}^d$ of words, wherein for the n-th word of the d-th document, $W_{ij}^{dn}$ is equal to said word.

In the preferred embodiment, an adjacency matrix $A=(A_{ij})$ is taken as an input, wherein $A_{ij}=1$ if there is an edge from vertex i to vertex j, and $A_{ij}=0$ otherwise. Alternatively, such an adjacency matrix could be obtained from a preliminary first step of the method, on the basis of stored sets of text data $W_{ij}$. The network is assumed not to have any self-loop, and therefore $A_{ii}=0$ for all i.

For given nodes i and j, whenever a set of text data $W_{ij}$ exists and $A_{ij}=1$, it is considered that a textual link exists between i and j. Just as the nodes can be referred to as vertices, in analogy with a graphical representation of the network, links can be referred to as edges, ie. an edge exists between i and j whenever $A_{ij}=1$. What's more, we will, in what follows, describe the case of a textual network wherein textual links (or edges) are directed, which means that for a given document $W_{ij}^d$ of set $W_{ij}$, node i is the sender and node j is the recipient. For example, if $W_{ij}^d$ is an e-mail and i and j correspond to e-mail addresses, the fact of having the e-mail stored in the database as $W_{ij}^d$ means that i sent the e-mail and j received it. In what follows, the text data having i as the sender and j as the recipient are stored in set $W_{ij}$, and the text data having j as the sender and i as the recipient are stored in set $W_{ji}$. It should be noted that all the proposed methodology easily extends to undirected networks: $W_{ij}$ could, for instance, contain all text data associated with nodes i and j. In such case, $A_{ij}=A_{ji}$ and $W_{ij}^d=W_{ji}^d$ for all i and j. The set $W_{ij}^d$ of documents can then model for example books or scientific papers written by both i and j, as will be the case in Example 3 below. $W=(W_{ij})_{ij}$ corresponds to the aggregate of set of all documents that are stored for all the edges present in the network.

Stochastic Topic-Block Model (STBM)—Modelling the Presence of Edges

Our goal is to cluster the M nodes into a number Q of latent groups, referred to as clusters, that are unobserved at first. Nodes of a cluster should have homogeneous connection profiles: two nodes in the same cluster should have the same trend to connect to others, and when connected, text data associated with any of the two nodes, and another node of a same other cluster, should be made of words related to similar topics.

The assignment of nodes into (unobserved at this point) clusters is represented, in a memory of the server, by a matrix $Y=(Y_1, \ldots, Y_M)$ of vectors $Y_i$, each one corresponding to the node i. Each vector $Y_i$ is of a size Q, Q equal to the total number of clusters, and $Y_{iq}=1$ if vertex i belongs to cluster q, and 0 otherwise. $Y_i$ is therefore a binary variable. The clustering task then consists in inferring clusters of nodes, wherein nodes clustered in the same cluster display similar trends to connect to other nodes, and thus, consists in inferring an optimized Y, noted $\hat{Y}$.

In order to model the presence of edges between pairs of vertices, a stochastic block model (SBM) is considered. Thus, the nodes are assumed to be spread into a number Q of latent clusters, and assignment of nodes into clusters is reflected by the values $Y_{iq}$, that are referred to hereafter as "cluster assignments".

The statistical model for assignment of nodes i into clusters q will now be described. Every binary vector $Y_i$ is assumed to be drawn from a multinomial distribution:

$$Y_i \sim M(1, \rho=(\rho_1, \ldots, \rho_Q))$$

$\rho$ is a vector of cluster proportions with a vector size equal to the number of clusters, wherein $\rho_q$ is an estimated ratio between the number of nodes clustered into cluster q and the total number M of nodes. By construction, the sum of all terms $\rho_q$ equals 1, and the sum, for a given node i, of all terms $Y_{iq}$ also equals 1 (the latter means that a given node i is only clustered into one cluster, and all other values of vector $Y_i$ are set to zero).

An edge from node i to node j is then sampled from a Bernoulli distribution, depending on their respective clusters q and r:

$$A_{ij} | Y_{iq} Y_{jr} = 1 \sim B(\pi_{qr}) \quad (1)$$

In words, if i is in cluster q and j in r, then $A_{ij}$ equals 1 with a probability $\pi_{qr}$.

An important first hypothesis is that the probability of an edge existing from node i to node j only depends on their respective clusters q and r. Thus, the behavior of a given node, in terms of how it is linked by text data with other nodes of the network, should be consistent with the behavior of the cluster it is clustered into, in terms of how it is linked with other clusters. $\pi$ is a Q×Q matrix of connection probabilities. Note that in the undirected case, $\pi$ would be a symmetric matrix.

All vectors $Y_i$ are sampled independently, and given $Y=(Y_1, \ldots, Y_M)$, all edges in A are assumed to be independent. This leads to the following joint distribution:

$$p(A, Y | \rho, \pi) = p(A | Y, \pi) p(Y | \rho)$$

$$= \prod_{i \neq j} \prod_{q,l} p(A_{ij} | \pi_{qr})^{Y_{iq} Y_{jr}} \prod_{i=1}^{M} \prod_{q=1}^{Q} \rho_q^{Y_{iq}}.$$

Stochastic Topic-Block Model (STBM)—Modelling the Content of Text Data

As mentioned previously, if an edge is present from vertex i to vertex j, then a set of documents $W_{ij}$ characterizing the oriented pair (i,j), contained in a database communicating with the server, is taken as an input of the method hereby described. Thus, from a statistical generative perspective, the edges in A would be first sampled with the aforementioned distributions. Given A, the documents in $W=(W_{ij})_{ij}$ are then constructed. The generative process that is used to build documents is related to a latent Dirichlet allocation (LDA) model. The STBM model relies on two concepts at the core of the SBM and LDA models respectively, as shown in the description of the topic inference process below. On one hand, a generalization of the SBM model is made, assuming that any kind of relationships between two nodes can be explained by their latent clusters only, in accordance with the first hypothesis set forth above. In the LDA model on the other hand, the main hypothesis is that words in documents are drawn from a mixture distribution over topics, each document d having its own vector of topic proportions $\theta_d$ (which is unobserved and is not part of the input data of the method). The STBM model combines these two concepts to introduce a novel generative procedure for documents in networks.

Each pair of clusters (q,r) of vertices is first associated to an unobserved (and not taken as an input of the method) vector of topic proportions $\theta_{qr}=(\theta_{qrk})_k$ which is sampled independently from the following Dirichlet distribution:

$$\theta_{qr} \sim Dir(\alpha=(\alpha_1, \ldots, \alpha_K)),$$

wherein each parameter $\alpha_k$ of the vector of parameters $\alpha=(\alpha_1, \ldots, \alpha_K)$ has a value strictly superior to 0 and impacts the global predominance of topic k over the text data associated with a node of cluster q and a node of cluster r.

A consideration of topics reflected in the content of the text data is therefore introduced in the STBM model, conversely to a mere SBM model. As a reminder, it is assumed that words $W_{ij}^{dn}$ of a document $W_{ij}^{d}$ are drawn from a mixture distribution over a number K of topics, with one given word (that is, one occurrence of a word) of this specific document belonging to one topic only. Topics are lists of words which co-occur frequently throughout the documents, meaning that when one word belonging to a given topic can be found in one document, other words belonging to the same given topic are more likely to also appear in the same document than any words of the vocabulary. The way in which topics (which are not inputted for the method hereby described) are inferred will be described below. It is also assumed here that every word of a document is sampled independently.

An important second hypothesis, which allows considering vectors of topic proportions that are indexed only by clusters (as opposed to being indexed by nodes considered individually) is that the vector of topic proportions $\theta_d$ for a given document $W_{ij}^{d}$, having node i as a sender and node j as a recipient, corresponds to the vector of topic proportions $\theta_{qr}$ with node i being clustered into cluster q and node j being clustered into cluster j. In other words, the topics that can be found in text data associated with two nodes are only a function of the clusters that said nodes respectively belong to. That means that the behavior of a given node, in terms of the topics found in the text data linking said node to other nodes, should be consistent with the behavior of the cluster it is clustered into. For example, if one topic is hugely predominant in the text data linking two nodes internal to a same given cluster, a given node should be more likely to be clustered into said given cluster if said predominant topic is also predominant in the text data linking said node to any other node that is already clustered into said given cluster.

The nth word $W_{ij}^{dn}$ of documents d in $W_{ij}$ is therefore associated to a latent topic vector $Z_{dn}$ assumed to be drawn from a multinomial distribution, depending on the latent vectors $Y_i$ and $Y_j$ (2):

$$Z_{ij}^{dn} | \{A_{ij} Y_{iq} Y_{jr} = 1, \theta\} \sim \mathcal{M}(1, \theta_{qr}).$$

As a result of the preceding distribution rules, if an edge is present ($A_{ij}=1$) and if i is in cluster q and j in r, then the word $W_{ij}^{dn}$ has a probability $\theta_{qrk}$ of being in topic k (which would translate in $Z_{ij}^{dnk}=1$). $Z_{ij}^{dn}$ is thus a vector of size K the number of topics, in which vector one value is set to 1 and all the other values are set to 0.

Then, knowing which topic a word $W_{ij}^{dn}$ belongs to (ie. knowing the latent topic vector $Z_{ij}^{dnk}$), it is assumed that said word is drawn from a multinomial distribution as follows (3):

$$W_{ij}^{dn} | Z_{ij}^{dnk} = 1 \sim \mathcal{M}(1, \beta_k = (\beta_{k1}, \ldots, \beta_{kV})),$$

wherein V is the number of (different) words in the vocabulary that is considered, for example the whole of the words that appear in the set W of all documents, and $\beta_{kv}$ corresponds to the proportion of a given v-th word of the vocabulary, among all occurrences of words that belong to the topic k throughout the set W.

Therefore, if $W_{ij}^{dn}$ is from topic k, then it is associated to word v of the vocabulary with a probability $\beta_{kv}$. The following mixture model for words over topics is thus obtained:

$$W_{ij}^{dn} \Big| \{Y_{iq} Y_{jr} A_{ij} = 1, \theta\} \sim \sum_{k=1}^{K} \theta_{qrk} \mathcal{M}(1, \beta_k).$$

wherein the K×V matrix $\beta = (\beta_{kv})_{kv}$ of probabilities does not depend on the cluster assignments.

All the latent variables $Z_{ij}^{dn}$ are assumed to be sampled independently and, given said latent variables, the words $W_{ij}^{dn}$ are assumed to be independent. Denoting $Z = (Z_{ij}^{dn})_{ijdn}$, this leads to the following joint distribution:

$$p(W, Z, \theta | A, Y, \beta) = p(W | A, Z, \beta) p(Z | A, Y, \theta) p(\theta)$$

$$= \prod_{i \neq j}^{M} \left\{ \prod_{d=1}^{D_{ij}} \prod_{n=1}^{N_{ij}^d} \prod_{k=1}^{K} p(W_{ij}^{dn} | \beta_k)^{Z_{ij}^{dnk}} \right\}^{A_{ij}} \times$$

$$= \prod_{i \neq j}^{M} \left\{ \prod_{d=1}^{D_{ij}} \prod_{n=1}^{N_{ij}^d} \prod_{q,r}^{Q} p(Z_{ij}^{dn} | \theta_{qr})^{Y_{iq} Y_{jr}} \right\}^{A_{ij}}$$

$$\prod_{q,r}^{Q} Dir(\theta_{qr}; \alpha).$$

Stochastic Topic-Block Model (STBM)—Probabilistic Model

The full joint distribution of the STBM model is given by $$p(A, W, Y, Z, \theta | \rho, \pi, \beta) = p(W, Z, \theta | A, Y, \beta) * p(A, Y | \rho, \pi) \quad (4)$$

Thus, all the documents in the set W of all text data of the network are involved in the full joint distribution through $p(W, Z, \theta | A, Y, \beta)$.

A general principle of the process of inference of clusters and topics that is involved in the described method is as follows. It is possible to reorganize the documents in the (complete) set W into a plurality of aggregates $W^*_{qr}$, with each aggregate $W^*_{qr}$ gathering all text data sent from any vertex i in cluster q to any vertex j in cluster r, as follows:

$$W = (\tilde{W}_{qr})_{qr} \text{ where } \tilde{W}_{qr} = \{W_{ij}^d, \forall (d, i, j), Y_{iq} Y_{jr} A_{ij} = 1\},$$

As mentioned in the previous section, each word $W_{ij}^{dn}$ has, in the STBM model, a mixture distribution over topics which only depends on q and r, which means that the distribution probabilities over topics k are the same in all the aggregate $W^*_{qr}$. Removing temporarily the knowledge of clusters q and r, ie. temporarily seeing $W^*_{qr}$ as a cohesive document d, the sampling scheme previously described corresponds to a LDA model with a number $D=Q^2$ of independent documents $W^*_{qr}$, each document having its own vector $\theta_{qr}$ of topic proportions. The model is then characterized by the matrix $\beta$ of probabilities as mentioned above. It is to be noted that the Dirichlet distributions hereby considered for the topic proportion vectors $\theta_{qr}$ depend on a fixed vector $\alpha$ of parameters. This corresponds to the complete data likelihood of a SBM model considered only with binary edges, which only involves the model parameters $\rho$ and $\pi$.

In the method that will be described below in detail, this fact allows, once a clustering Y is set (in the form of cluster assignments $Y_{iq}$) and with the same set value of parameter vector $\alpha$ along the whole inference, to optimize independently:

the values of parameters $\rho$ and $\pi$, that are related to the existence of links between nodes temporarily seen as binary edges, and the values of parameters W, Z, $\theta$ and $\beta$ that are related to the topics found within the text data, wherein text data are temporarily gathered in text aggregates $W^*_{qr}$.

Figure 2:
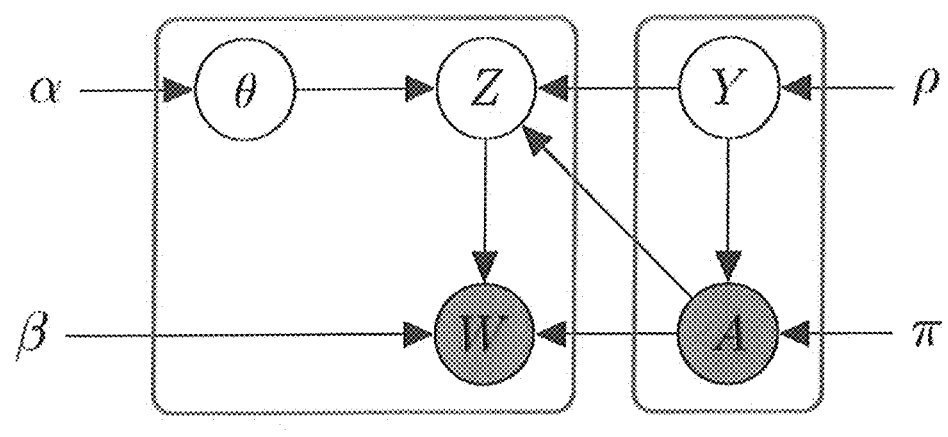
FIG. 2 represents the STBM model that is described below by displaying relationships between the corresponding latent and observed variables, in the form of a "plate notation" commonly used in statistical analysis.

A graphical representation of the Stochastic Topic-Block Model (STBM) disclosed above is given in FIG. 2, following a standard "plate notation" as commonly used in statistical analysis. Observed variables of the model (among which, the data taken as an input of the described method) are represented with circles having a grey background, whereas other variables are unobserved. Dependencies of a certain (observed or unobserved) variable from another variable are depicted by a directed edge within a round-edged rectangle. Dependencies of a certain variable from a parameter of the model, that is also evaluated by the statistical inference, are depicted by a directed edge pointed at a variable from outside the rectangles. An aim of the method is to obtain optimized and topic-meaningful cluster assignments Ŷ. The method also determines latent topic vectors Z and optimized vectors of topic proportions $\theta^*$. Especially, vectors of topic proportions $\theta^*$ can also make for meaningful information, for example in order to determine the majority topics in messages between groups of a communication textual network. The matrix of probability of connection $\pi$ can also make for exploitable output information of the method, in order to establish which clusters tend to be linked with each other the most.

We now consider FIG. 1, which, as mentioned in the introduction, corresponds to a clustered structure of the prior art obtained via a standard clustering method of inference from binary edges and a SBM model. The data set of network data which the clustering represented in FIG. 1 originates from, which will be referred to as Example 1, is generated with the following parameter values:

| Parameter | Values for Example 1 |
|---|---|
| Number of communities | 3 |
| M (number of nodes) | 100 |
| K (total number of topics) | 3 |
| Q (total number of groups) | 4 |
| ρ (group proportions) | 1/Q for each cluster q |
| Π (connection probabilities) | $\Pi_{qq} = 0.25$ |
| | $\Pi_{qr,\, r'=q} = 0.01$ |
| θ (proportions of topics) | $\theta_{111} = \theta_{331} = 1$ |
| | $\theta_{222} = \theta_{442} = 1$ |
| | $\theta_{qr3,\, r'=q} = 1$ |
| | all remaining proportions $\theta_{qrk}$ equal to 0 |

Indeed, Example 1 corresponds to a textual network comprising four groups of same sizes. The particular feature of the scenario of this data set is that among the 4 groups, two groups correspond to clear communities (in terms of existence of binary edges) and persons talk preferentially about a unique topic within the communities, whereas the two other groups correspond to a single community in terms of binary edges, and are only discriminated by the topic used in the communications.

In other words, even though there are only 3 "communities" when only the existence of edges is considered (ie. only the matrix u), there are indeed 4 "groups" when also considering the topics. A clustering method based solely on a SBM model is unable to recover the structure of two groups 3 and 4 within this single community. In other words, a clustering method with a SBM model recovers only the community structure, and not the more refined group structure, in this example. People from group 3 use topic 1 and the topic 2 is used in group 4. Topic 3 is used for all communications between separate groups (including between groups 3 and 4 of the same community).

The simulated messages of Example 1 are sampled from four texts from BBC news: one text is about the birth of Princess Charlotte, the second one is about black holes in astrophysics, the third one is focused on UK politics, and the last one is about cancer diseases in medicine. All messages are made of 150 words. The table below provides the parameter values for the three simulation scenarios. It is worth noticing that this scenario has been designed such that it does not strictly follow the STBM model, and therefore does not favor said model specifically.

A method of the prior art, using solely a SBM model of the textual network without taking into account the topics, is unable to recover this four-group structure, as shown in the graphical representation of FIG. 1, with the aforementioned conventions: punctual vertices correspond to nodes i, and directed edges correspond to all values $A_{ij}$ that are set to 1 within the adjacency matrix.

Indeed, only 3 clusters (corresponding to the "communities") are inferred.

The following references are included in FIG. 1:
a node $i_1$, which indeed belongs to group 1 of the data set, is clustered into cluster 1, which translates in binary vector $Y_{i1pr}$ (pr standing for "prior art"), as a vector of cluster assignment of node $i_1$, having values of (1,0,0),
a node $i_3$, which indeed belongs to group 2 of the data set, is clustered into cluster 2, which translates in a binary vector $Y_{i3pr}=(0,1,0)$,
a node $i_2$, which indeed belongs to group 4 of the data set (group 4 being a sub-group within community 3), is clustered into cluster 3, which translates in a binary vector $Y_{i2pr}=(0,0,1)$, a node $i_4$, which indeed belongs to group 3 of the data set (group 3 being a sub-group within community 3), is also clustered into cluster 3, which translates in a binary vector $Y_{i2pr}=(0,0,1)$.

However, it is desirable that nodes $i_2$ and $i_4$ not be clustered into a same cluster of the optimized output clusters.

Method of Clustering in a Preferred Embodiment—Introduction

We will now describe an embodiment of a clustering method. The notations introduced above, for variables, data and parameters of the STBM model, are reprised in what follows for description of the steps of the method of said embodiment. In the following, we will consider the case of directed links between nodes. This means that for a given pair (i,j) of nodes which are linked by text data in the network, it is possible that a text document sent from node i to node j exists, but not the contrary. Especially, the case "$A_{ij}=1$ and $A_{ji}=0$" is therefore plausible. Alternatively, what follows could easily be adapted by the skilled person to the case of undirected links between nodes.

Figure 3:
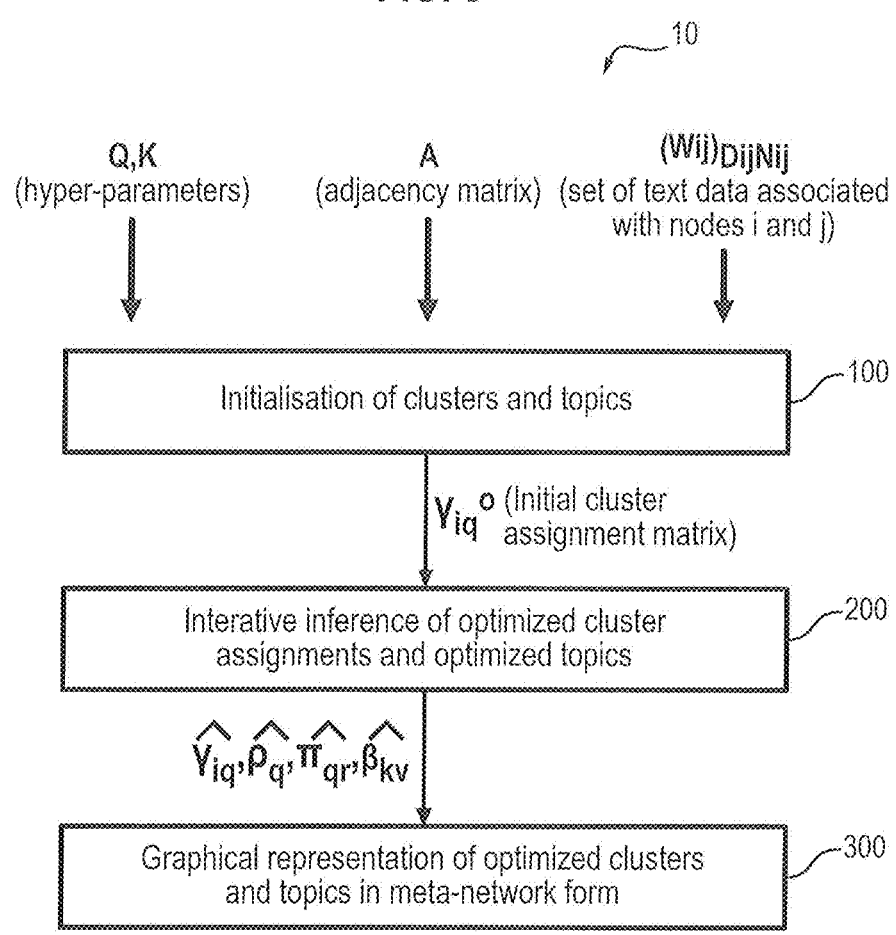
FIG. 3 is a schematic flow chart of an embodiment of a method for clustering nodes of a textual network and displaying said clustering in a graphical representation of the network.

Referring now to FIG. 3, which schematically represents the main steps of clustering process 10, for a given textual network as defined above, the following data is taken as an input of process 10:
the adjacency matrix $A=(A_{ij})_{ij}$, which reflects existence in the textual network of text data associated with two nodes i and j of the network,
for each pair (i,j) of nodes for which text data sent from node i to node j exists, the set of text data $W_{ij}=(W_{ij}^{dn})_{dn}$ that are sent from node i to node j,
predetermined values Q (number of clusters) and K (number of topics), which will be referred to below as hyper-parameters.

Here, the adjacency matrix A and the sets of text data W, are retrieved, as an input of the process 10, from a database associated with the textual network. Alternatively, the clustering process 10 could take only an unorganized set of text data corresponding with the textual network as an input. The only requisite is that in each text datum, at least two nodes i and j that are associated with the text datum can be identified from the unorganized set of data, so that in a preliminary step (which is not represented in FIG. 3) prior to initialization of the cluster assignments, an adjacency matrix A and sets of text data $W_{ij}$ can be determined. When reference is made below to data set W, W is to be construed as the aggregation of all text data $W_{ij}$.

Clustering Method—Initialization

Figure 4:
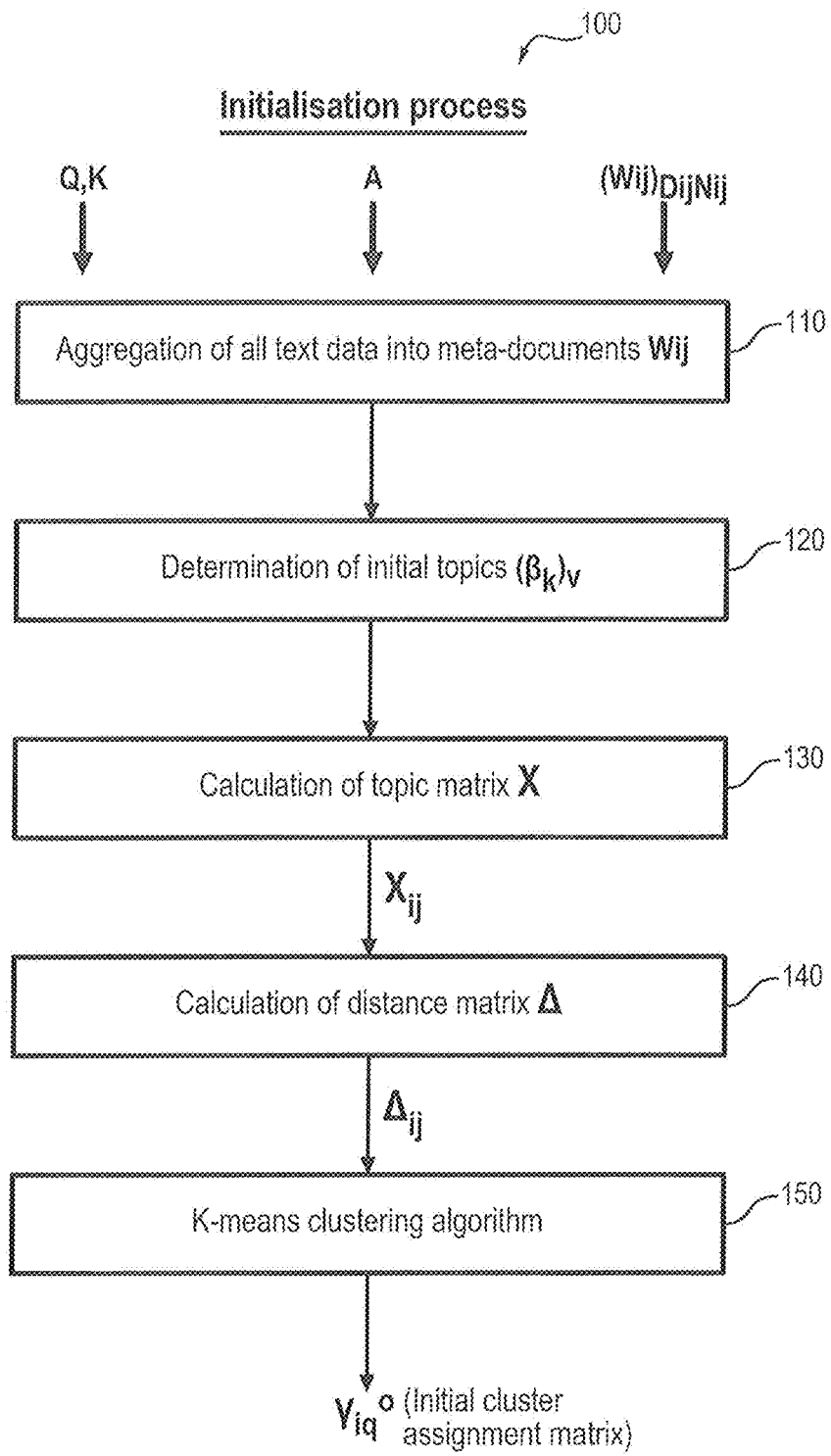
FIG. 4 schematically details a cluster and topic initialization process which is a step of the method of the embodiment of FIG. 3.

In a first initialization step 100, an embodiment thereof is now described in relation with FIG. 4, initial cluster assignments $Y_{iq}^0$ are calculated. In all the following, the clustering process 10 stores values of cluster assignments in a computer memory, by any means that allow to register a logical link between node i and cluster q in the memory. For instance, a matrix Y of M rows (M being the number of nodes of the network) and Q columns (Q being the number of clusters) can be instantiated with zeros, and for each node i, one value is set to 1 corresponding to the initial cluster of the node. The stored cluster assignments are to be updated through the clustering process 10.

As any EM (expectation-maximization) algorithm, the clustering method 10 depends on the initialization, and is only guaranteed to coverge to a local optimum (Bilmes, 1998)[21]. Strategies to tackle this issue include simulated annealing, and the use of multiple initializations (Biernacki et al., 2003)[22]. The latter option is hereby chosen.

In the embodiment that is schematically represented in FIG. 4, initialization of the cluster assignments (i.e. calculation of vectors $Y_i^0$) is carried out using a k-means clustering algorithm applied on a topic matrix X, after use of a variational expectation-maximization (VEM) algorithm, such as described in Blei et al.[6], in relation with a LDA model of the text documents to infer the topic matrix X.

In a first step 110, on the basis of complete data set W, for each pair of nodes (i,j) for which $A_{ij}=1$, an aggregated document $W^*_{ij}$ (which can alternatively be referred to as a "meta-document") is created by the server, comprising all the words used in all text documents sent from node i to node j.

Afterwards, in a step 120, a VEM algorithm, which corresponds to the generative model of documents of the STBM statistical model introduced above, is run over all aggregated documents $W^*_{ij}$ in order to determine initial topic vectors $\beta_k=(\beta_{kv})_v$. The index v corresponds to indexation of all the words that are used in the whole set of text data W. Here, each topic k corresponds to a topic vector $\beta_k$, which has a size of V the total number of unique words used throughout the data set W of all text data (i.e. V is the number of words within the vocabulary), with $\beta_{kv}$ being the probability that a word belonging to topic k corresponds to the v-th word of said vocabulary. The total list of V words is registered in a database. Alternatively, the vocabulary of words v could be extended to any desired list of words, for example the whole of a dictionary. In such case, words v can be indexed not only over the words that do appear in the set of text data W, but over the whole of said list of words. This VEM algorithm is similar to the VEM algorithm that is subsequently run (over other aggregated documents than documents $W^*_{ij}$, as will be explained below) in order to infer discussion topics in the inference step 200 of clustering process 10.

The VEM algorithm for determination of initial topic vectors $\beta_k$—which will be largely reprised for determination of topics throughout the iterative inference process 200—is as follows. We remind here that for the STBM model, the full joint distribution is obtained by the following expression:

$$p(A, W, Y, Z, \theta \mid \rho, \pi, \beta) = p(W, Z, \theta \mid A, Y, \beta) * p(A, Y \mid \rho, \pi)$$

with $$p(W, Z, \theta \mid A, Y, \beta) = p(W \mid A, Z, \beta)p(Z \mid A, Y, \theta)p(\theta)$$

$$= \prod_{i \neq j}^{M} \left\{ \prod_{d=1}^{D_{ij}} \prod_{n=1}^{N_{ij}^d} \prod_{k=1}^{K} p(W_{ij}^{dn} \mid \beta_k)^{Z_{ij}^{dnk}} \right\}^{A_{ij}} \times$$

$$\prod_{i \neq j}^{M} \left\{ \prod_{d=1}^{D_{ij}} \prod_{n=1}^{N_{ij}^d} \prod_{q,r}^{Q} p(Z_{ij}^{dn} \mid \theta_{qr})^{Y_{iq}Y_{jr}} \right\}^{A_{ij}}$$

$$\prod_{q,r}^{Q} Dir(\theta_{qr}; \alpha).$$

This joint distribution can be associated to a complete data log likelihood function that is expressed as follows, with respect to the model parameters ($\rho$, $\pi$, $\beta$) and the set $Y=(Y_1, \ldots, Y_M)$ of cluster membership vectors (5):

$$\log p(A, W, Y \mid \rho, \pi, \beta) = \log \sum_Z \int_\theta p(A, W, Y, Z, \theta \mid \rho, \pi, \beta) d\theta,$$

The general principle of the inference steps that allow to infer cluster assignments or topics is to maximize, over a certain parameter, a lower bound L of this complete data log likelihood.

Through the whole of clustering process 10, the goal is not to provide any approximate posterior distribution of Y given the data set W and the model parameters. Conversely, Y is seen as a set of (binary) vectors for which we aim at providing estimates. This choice is motivated by the key property of the STBM model, i.e. for a given value of cluster assignments Y, the full joint distribution factorizes into a "LDA like" term and a "SBM like" term. In particular, given Y, words in the whole data set W can be seen, for obtaining the data log likelihood, as being drawn from a LDA model with a certain number of documents. In step 120, this number of documents is equal to $M^2$ at the maximum. It is equal to the number of pairs (i,j) for which text data exists sent from node i to node j.

As pointed out in introduction, fast optimization tools, based on VEM algorithms, are known in order to infer topics.

In the case of the STBM model, the variational decomposition of the expression of the complete data log likelihood leads to $$\log p(A,W,Y|\rho,\pi,\beta)=L(R;Y,\rho,\pi,\beta)+KL(R||p(\bullet|A,W,Y,\rho,\pi,\beta)),$$

wherein term L, that corresponds to a lower bound, is as follows (6):

$$\mathcal{L}(R(\cdot); Y, \rho, \pi, \beta) = \sum_Z \int_\theta R(Z, \theta) \log \frac{p(A, W, Y, Z, \theta \mid \rho, \pi, \beta)}{R(Z, \theta)} d\theta,$$

and the term KL denotes the Kullback-Leibler divergence between the true and approximate posterior distributions of (Z, $\theta$), given the data and model parameters, and is obtained as follows:

$$KL(R(\cdot)||p(\cdot \mid A, W, Y, \rho, \pi, \beta)) = -\sum_Z \int_\theta R(Z, \theta) \log \frac{p(Z, \theta \mid A, W, Y, \rho, \pi, \beta)}{R(Z, \theta)} d\theta,$$

Since log p(A, W, Y|$\rho$, $\pi$, $\beta$) does not depend on the distribution R(Z, $\theta$), maximizing the lower bound L with respect to R(Z,$\theta$) induces a minimization of the KL divergence.

More, R(Z, $\theta$) can be factorized over the latent variables in $\theta$ and Z. In our case, this translates into the following factorization:

$$R(Z, \theta) = R(Z)R(\theta) = R(\theta) \prod_{i \neq j, A_{ij}=1}^{M} \prod_{d=1}^{D_{ij}} \prod_{n=1}^{N_{ij}^d} R(Z_{ij}^{dn}).$$

When deriving equation (6) above, we obtain the following:

$$\mathcal{L}(R(\bullet);Y,\rho,\pi,\beta)=\mathcal{L}(R(\bullet);Y,\beta)+\log p(A,Y|\rho,\pi),$$

where (7):

$$\tilde{\mathcal{L}}(R(\cdot); Y, \beta) = \sum_Z \int_\theta R(Z, \theta) \log \frac{p(W, Z, \theta | A, Y, \beta)}{R(Z, \theta)} d\theta$$

Therefore, in step 120, in order to obtain initial topic vectors $\beta_k$ and associated $R(Z,\theta)$, with Z the latent topic vectors of the words of documents $W^*_{ij}$ and $\theta$ the topic proportions, a VEM algorithm is run, wherein:

the VEM update step 121 for distribution $R(Z_{ij}^{dn})$ with set values of all other parameters is given by $$R(Z_{ij}^{dn}) = \mathcal{M}(Z_{ij}^{dn}; 1, \phi_{ij}^{dn} = (\phi_{ij}^{dn1}, \ldots, \phi_{ij}^{dnK}),$$

where $$\phi_{ij}^{dnk} \propto \left(\sum_{v=1}^V W_{ij}^{dnv} \log \beta_{kv}\right) \prod_{q,r}^Q \left(\varphi\left(\gamma_{qrk} - \psi\left(\sum_{l=1}^K \gamma_{qrl}\right)\right)\right)^{Y_{iq}Y_{jr}}, \forall (d, n, k).$$

the VEM update step 122 for distribution $R(\theta)$ with set values of all other parameters is given by $$R(\theta) = \prod_{q,r}^Q Dir(\theta_{qr}; \gamma_{qr} = (\gamma_{qr1}, \ldots, \gamma_{qrK})),$$

where $$\gamma_{qrk} = \alpha_k + \sum_{i \neq j}^M A_{ij} Y_{iq} Y_{jr} \sum_{d=1}^{N_{ij}^d} \sum_{n=1}^{N_{ij}^{dn}} \phi_{ij}^{dnk}, \forall (q, r, k).$$

once the update step has been carried out, the estimation step 123 of parameters $\beta_k$ (i.e. the initial topic vectors) with the distributions of steps 121 and 122 being set is given by $$\beta_{kv} \propto \sum_{i \neq j}^M A_{ij} \sum_{d=1}^{N_{ij}} \sum_{n=1}^{N_{ij}^{dn}} \phi_{ij}^{dnk} W_{ij}^{dnv}, \forall (k, v)$$

A demonstration of the mathematical expressions above is included in appendix. The step 120 therefore consists in a certain number (that can be predetermined prior to running the clustering process 10) of iterations of steps 121, 122 and 123 (in this order or another order).

More concretely, the purpose of the operations carried out in step 120 is to find out words which co-occur frequently throughout the set of aggregates $W^*_{ij}$. Two words are determined to co-occur frequently if, when one of the two is present in any aggregated document $W^*_{ij}$, the other one is more likely to also be present in this aggregate than in another aggregate where the first word is absent. In this manner, a topic k gathers words (corresponding to indexes v for which the value of $\beta_{kv}$ is non-null) which co-occur frequently, with an assumption being made that said words amount to a meaningful topic for a human reader.

The output of step 120 is the determined initial topic vectors $\beta_k$ and the corresponding topic vectors Z and vectors of topic proportions $\theta_{ij}$. In a subsequent step 130 of the particular initialization process 100 hereby described, a topic matrix X is calculated for the textual network, said matrix being of size M×M, comprising a plurality of topic matrix values $X_{ij}$ each associated to the text data sent from node i to node j, wherein a topic matrix value $X_{ij}$ is associated to a majority topic k.

In other terms, every topic k inferred in step 120 is associated with a certain fixed value (this value being typically the value of index v for the topic k), and when the majority topic in the text data sent from node i to node j is determined in step 130 as being the topic k, the value $X_{ij}$ is instantiated by $X_{ij}=k$.

In a subsequent step 140, taking as an input the topic matrix X, a distance matrix $\Delta$ which is also of size M×M is calculated. This distance matrix $\Delta$ is a symmetrical matrix. (It is reminded that in the case of a directed network, the adjacency matrix A is, in most cases, not symmetrical.) This distance matrix comprises a plurality of distance values $\Delta_{ij}$ each associated to a pair of nodes, which is calculated according to similarity of the topic matrix values associated to the first node of the pair with the topic matrix values associated to the second node of the pair. This means that, for any third node m, if the majority topic in text data associated with i and m is the same as the majority topic in text data associated with j and m, the distance between i and j, which corresponds to value $\Delta_{ij}$ tends to be lowered.

The expression of term $\Delta_{ij}$ for a given pair (i,j) of nodes is as follows (8):

$$\Delta(i, j) = \sum_{h=1}^N \delta(X_{ih} \neq X_{jh}) A_{ih} A_{jn} + \sum_{h=1}^N \delta(X_{hi} \neq X_{hj}) A_{hi} A_{hj},$$

In the expression above of matrix element $\Delta_{ij}$ for the distance matrix, the first term looks at all possible edges from i and j toward a third vertex h. If both i and j are connected to h by a message edge of adjacency matrix A, i.e. $A_{ih}A_{jh}=1$, the edge types $X_{ih}$ and $X_{jh}$ in topic matrix X (i.e. the majority topics in the text data sent from node i to node h, and in the text data sent from node j to node h, respectively) are compared. By symmetry, the second term of the expression above of matrix element $\Delta_{ij}$ looks at all possible edges from a vertex h to both i as well as j, and compare their edge types. Thus, the distance $\Delta_{ij}$ computes the number of discordances in the way both nodes i and j connect to other nodes of the textual network.

In a final step 150 of the initialization process 100, a standard K-means clustering algorithm is run, taking as an input the values for each pair of nodes (i,j) of the distance function $\Delta(i,j)$, using any known K-means optimization approach. This K-means method allows determination of initial clusters, in the form of initial cluster assignments $Y_{iq}^0$. Initial values of other parameters related to the clustering (vectors of topic proportions $\theta_{qr}$, matrix of probability of connections $\pi$, vector of cluster proportions $\rho$) can eventually easily be determined from initial cluster assignments $Y_{iq}^0$ (see description of steps 210 and 220).

Clustering Method—Inference of Optimized Clusters and Topics

Once initial clustering is established as a result of initialization step 100, or alternatively as a result of any other relevant initialization procedure (or instantiated randomly), a step 200 of iterative inference of optimized cluster assignments $\hat{Y}_{iq}$ and optimized topics $\beta_k$ is run.

Figure 5:
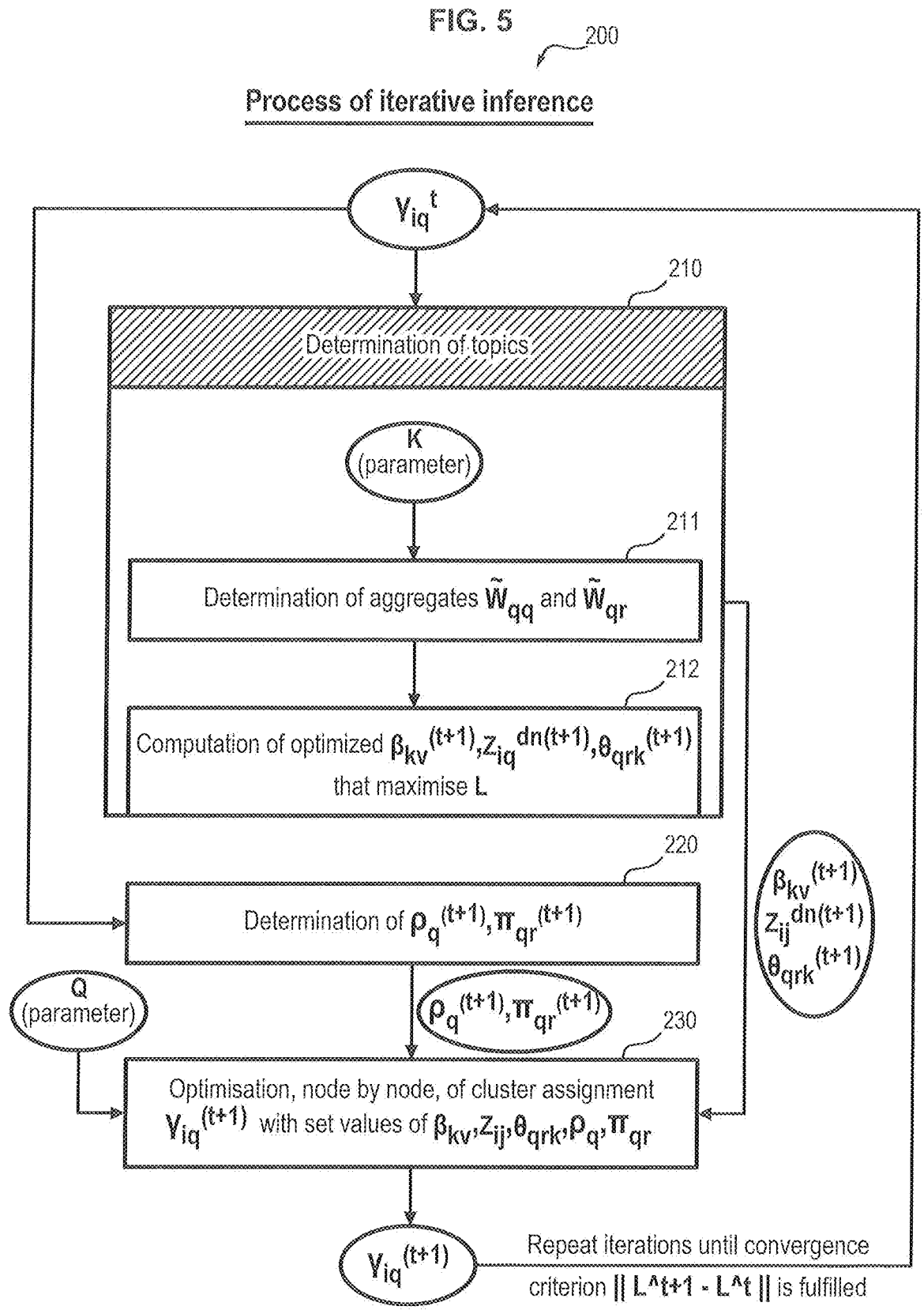
FIG. 5 schematically details the cluster and topic inference process which is another step of the method of the embodiment of FIG. 3.

A particular embodiment of an inference process 200 will now be described in relation with FIG. 5. This inference process is iterative. In what follows, successive iterations will be indexed by index t. When reference is made to a "current" value of a parameter or datum, the "current" value reads as the latest updated value in the computer memory. In the first iteration of step 200, initial cluster values $Y_{iq}^0$ and initial values of other parameters (vectors of topic proportions $\theta_{qr}$, matrix of probability of connections $\pi$, vector of cluster proportions $\rho$, topic vectors $\beta_k$, topic vectors $Z_{ij}^{dn}$) are used. Because the proposed methodology requires a variational EM (VEM) approach as well as a classification step, the corresponding algorithm classification is hereafter called classification VEM (C-VEM).

Considering the current values of cluster assignments $Y_{iq}$, and taking as an input the desired number K of topics, step 210 is carried out which corresponds to determination of discussion topics using the generative model of documents. The operations of step 210 are similar in principle to the operations of step 120 of the particular embodiment of initialization process described above.

However, the model for finding topics (based on co-occurrence of words) is not used over aggregated documents $W^*_{ij}$, but over aggregates $W^*_{qr}$ which are created taking only into account the current cluster assignments of the nodes which are linked by text data. In other words, the current aggregate $W^*_{qr}$ gathers words of all text data sent from a node of cluster q to a node of cluster r. In sub-step 211 of step 210, aggregates $W^*_{qq}$ (for text data linking nodes that are within a same current cluster) and aggregates $W^*_{qr}$ (for text data linking nodes that are in two different current clusters) are created and the relevant memory of the server is updated in accordance with the current aggregates.

In sub-step 212 of step 210, a VEM algorithm is run over all said aggregates, which corresponds to maximization of the lower bound L of the complete data log likelihood of the STBM model as mentioned above. In the same way as sub-steps 121, 122 and 123 are repeated in step 130 described above for the initialization process 100, the VEM algorithm of sub-step 212 alternates between determination, for fixed values of topic vectors $\beta_k$, of the distribution R(Z,θ), and determination, at fixed distribution R(Z,θ), of optimized topic vectors $\beta_k$. The number of repetitions can be up to a predetermined number, depending on the computational complexity or running time desired.

As a result of step 210, current values of topic vectors $\beta_k$ are optimized to the optimized topic vector values $\beta_k^{t+1}$ output from the last repetition of step 212. The current values $Z_{ij}^{dn}$ of topic vectors are also updated to values $Z_{ij}^{dn(t+1)}$. The corresponding values of vectors of topic proportions $\theta_{qr}^{t+1}$ (i.e. the proportion of each determined topic k among the words contained in the text data sent from a node of current cluster q to current cluster r) are also acquired, and the current vectors of topic proportions $\theta_{qr}$ are updated accordingly. We remind that the parameter β and the distribution R(Z, θ) are only involved in the lower bound L.

Separately to determination of topics $\beta_k^{t+1}$ from the current values of cluster assignments $Y_{iq}^t$, the parameters $\rho^{t+1}$ and $\pi^{t+1}$ which are obtained from current values of cluster assignments $Y_{iq}^t$, which are only involved in log p(A,Y|ρ,π) as described above, are estimated in a step 220 of iterative inference process 200.

The estimate of current vector ρ of cluster proportions is as follows:

$$\rho_q \propto \sum_{i=1}^{Q} Y_{iq}, \forall q$$

The estimate of current value $\pi_{qr}$ of the matrix π of probability of connection between a node of current cluster q and a node of current cluster r is as follows:

$$\pi_{qr} = \frac{\sum_{i \neq j}^{M} Y_{iq} Y_{jr} A_{ij}}{\sum_{i \neq j}^{M} Y_{iq} Y_{jr}}, \forall (q, r)$$

It is to be noted that, since steps 210 and 220 can be independently carried out departing from the same current values of cluster assignments $Y_{iq}$, step 220 could alternatively be carried out prior to step 210.

Taking as an input the whole of the current values of parameters obtained above from cluster assignments $Y_{iq}^t$, i.e. values $Z_{ij}^{dn(t+1)}$, $\theta_{qr}^{t+1}$, $\beta_k^{t+1}$, $\rho^{t+1}$, $\pi^{t+1}$, the current values of clustering assignments $Y_{iq}$ are then updated, in a step 230 of the iterative inference step 200, to new values $Y_{iq}^{t+1}$, according to the desired number Q of clusters.

Updating of the cluster assignments is done through optimization, node by node, of the cluster structure, by reference to the current values of all parameters of the STBM model in the memory. Here, we use the outstanding property of the STBM model, that Y is the only term involved in both the lower bound L and the SBM complete data log likelihood log p(A,Y|ρ,π). Therefore, step 230 consists in maximizing L(R(•); Y, ρ, π, β) with fixed values of all parameters except Y. Y is not seen here as a set of latent variables, but as a set of (binary) vectors for which it is desired to provide estimates.

Looking for the optimal solution Y maximizing this value is not feasible since it involves testing the $Q^M$ possible cluster assignments. However, heuristics are available to provide local maxima for this combinatorial problem. These so-called "greedy" methods have been used for instance to look for communities in networks by Newman (2004)[12] and Blondel et al. (2008)[13] but also for the SBM model (Côme and Latouche, 2015)[14]. They are sometimes referred to as on-line clustering methods, such as in Zanghi et al. (2008)[15].

In step 230, the algorithm cycles randomly through the vertices. At each step, a single node i is considered, and all cluster assignments $Y_j$ are held fixed for all other nodes, except node i. With q being the current cluster in which node i is clustered (i.e. $Y_{iq}^t$=1), the algorithm looks in step 230 for every possible label swap, i.e. removes i from cluster q and assigns it to a cluster r different from q.

The corresponding change in the lower bound L is then computed. If no cluster swap for node i induces an increase in the lower bound, then the cluster assignment $Y_i$ remains unchanged and $Y_i^{t+1}=Y_i^t$. Otherwise, the cluster swap for node i that yields maximal increase of the value of lower bound L is applied, and cluster assignment $Y_i$ is changed accordingly: for the cluster q that provides maximum value of L, $Y_{iq}^{t+1}$=1. As a result of going through all nodes i in this manner in step 230, updated current cluster assignments $Y_{iq}^{t+1}$ are output.

The criterion that manages the stoppage of iterative inference step 200 (one iteration consisting in steps 210, 220 and 230 being carried out once) in a C-VEM algorithm is a convergence criterion for the lower bound L. Iterative inference stops at iteration (t+1) if the following convergence criterion is fulfilled, with ε being a predetermined arbitrarily small value:

$$|L^{t+1} - L^t| \leq \varepsilon$$

which can be interpreted as the cluster assignments $Y_{iq}$ having reached a stable state which is considered as close to an optimized clustering for the textual network.

When the convergence criterion is determined as fulfilled, there is a determination that the current values stored in the memory, for $Y_{iq}$, $Z_{ij}^{dn}$, $\theta_{qr}$, $\beta_k$, $\rho$ and $\pi$, updated at the latest iteration of the iterative inference step 200, are optimized values. Especially, the values $\hat{Y}_{iq}$ of optimized cluster assignments allow to recover topic-meaningful clusters of the textual network, which will be reflected in the following Examples 1, 2 and 3. The inferred cluster assignments and optimized values of parameters make for an inferred STBM model of the considered textual network. Said inferred values represented in FIG. 3 as an output of step 200 are represented with a circumflex accent, so as to notify that these are determined as optimized values following convergence of the iterative inference process (which is also the case in other figures).

As an option, the iterative inference step 200 of topic-meaningful clusters can be followed by a step 300 of graphical representation of inference results. Any form of graphical representation that allows for a human reader to understand the results of the clustering method can be used. Here, mainly two methods of representation of clusters of a textual network, as a result of inference of the STBM model, will be explored: the standard representation that is already used in FIG. 1 which is representative of the clustering results of a method of the prior art, and a representation of the inferred clusters in the form of a meta-network. The meta-network representation will be detailed below in relation with Example 1 and FIG. 9.

Determination of Best-Fit Values of Hyper-Parameters Q and K

The method 10 of the aforementioned exemplary embodiment is run with fixed values of the parameters Q (number of clusters q) and K (number of topics k). This means that at each iteration of the inference process 200, update of the topics and update of the cluster assignments are made while keeping a number Q of clusters and a number K of topics.

However, beyond determining a predetermined number Q of optimized topic-meaningful clusters of nodes of a textual network, it is also highly desirable to provide a clustering method which is able to find an optimum number of clusters q and/or of topics k by itself, taking the adjacency matrix A and the sets of text data $W_{ij}$ as input.

The C-VEM algorithm introduced in the previous section for inferring clusters and topics in clustering method 10 allows the estimation of $R(Z, \theta)$, Y, as well as ($\rho$, $\pi$, $\beta$), for a fixed number Q of clusters and a fixed number K of topics. Two STBM models obtained with different values of Q and/or K are therefore seen as different. The task of estimating Q and K can be viewed as a model selection problem. We hereby consider, for operating said model selection, a BIC-like criterion which is known to have relevant asymptotic properties (Leroux, 1992)[16]. Such a criterion estimates the marginal log likelihood using a Laplace approximation, and allows to select the most appropriate values for hyper-parameters Q and K in view of the input data representative of the textual network (adjacency matrix A and sets of text data $W_{ij}$).

An exemplary embodiment of a method for determining best-fit values (Q*, K*) of hyper-parameters Q and K with respect to a textual network, obtaining the relevant topic-meaningful clusters with said best-fit hyper-parameters, and outputting graphical representation of said textual network and calculation results for the tested pairs of hyper-parameters, will now be described in relation with FIG. 6.

This exemplary embodiment corresponds to method 1 of determining best-fit hyper-parameters for a textual network. Steps of said method are schematically represented in FIG. 6.

Method 1 takes as an input the network data that an instance of previously described clustering method 10 takes as an input, i.e. an adjacency matrix A and sets of text data W.) (directed or undirected) of a textual network. Method 1 also takes as an input a set of pairs of hyper-parameters (Q,K) that are to be tested. Those values can either be entered explicitly, or obtained by any other means, for example by setting a maximum value $Q_{max}$ of number of clusters and a maximum value $K_{max}$ of number of topics, below which every value of Q and K is tested.

In the particular embodiment of method 1, for each value of pair (Q,K) of hyper-parameters, the clustering method 10 described above is run over the input data A and $W=(W_{ij})_{ij}$. For every instance of the clustering method 10 (i.e. for every pair (Q,K)), an additional ulterior step 400 is run, which corresponds to calculation of a "quality score" for the inferred parameters of the model with the current pair (Q,K).

Step 400 relies on an ICL-like criterion, which, in the context of the STBM model, aims at approximating the integrated complete data log-likelihood log p(A,W,Y).

An ICL (Integrated Completed Likelihood) criterion for the STBM can be obtained which reads as follows:

$$ICL_{STBM} = \tilde{\mathcal{L}}(R(\cdot); Y, \beta) - \frac{K(V-1)}{2}\log Q^2 +$$

$$\max_{\rho,\pi} \log p(A, Y | \rho, \pi, Q) - \frac{Q^2}{2}\log M(M-1) - \frac{Q-1}{2}\log M.$$

This result relies on two Laplace approximations: a variational estimation, as well as a Stirling formula. It involves two parts: a BIC-like term associated to the text part of the STBM a generative model of a number $Q^2$ of documents (corresponding to the aggregates $W^*_{qr}$), and an ICL criterion for the network part of STBM, which is similar to the criterion introduced by Daudin et al. (2008)[17].

Thus, following step 200 of iterative inference of a STBM model of the considered textual network with a certain value of (Q,K) (and optionally, a step 300 of outputting a graphical representation of the inferred parameters, clusters and topics of the model), a step 20 of determination of the best-fit parameters (Q*,K*) for the textual network ensues. Step 20 compares the obtained values of $ICL_{STBM}$ criterion for all tested values of hyper-parameters (Q,K). A determination is made that the pair (Q,K) which provides the highest value of function $ICL_{STBM}$ (with each value of said function being calculated with all optimized parameters output from step 200 of inference) is an optimized pair of hyper-parameters (Q*,K*).

In an optional step 30, a graphical representation of a meta-network can be obtained and output, in accordance with all optimized inferred values $Z_{ij}^{dn}$, $\theta_q$, $\beta_k$, $\rho$, $\pi$ for optimized values (Q*,K*) of the hyper-parameters of the STBM model.

INTRODUCTIVE EXAMPLE 1

Comparison of SBM and STBM Models

We now go back to the data set of Example 1 of a textual network comprising four groups of same sizes, among which two groups correspond to clear communities (in terms of existence of binary message edges $A_{ij}$) and persons talk preferentially about a unique topic within said communities, whereas the two other groups correspond to a single community in terms of binary edges, and are only discriminated by the topic used in the communications.

Figure 7:
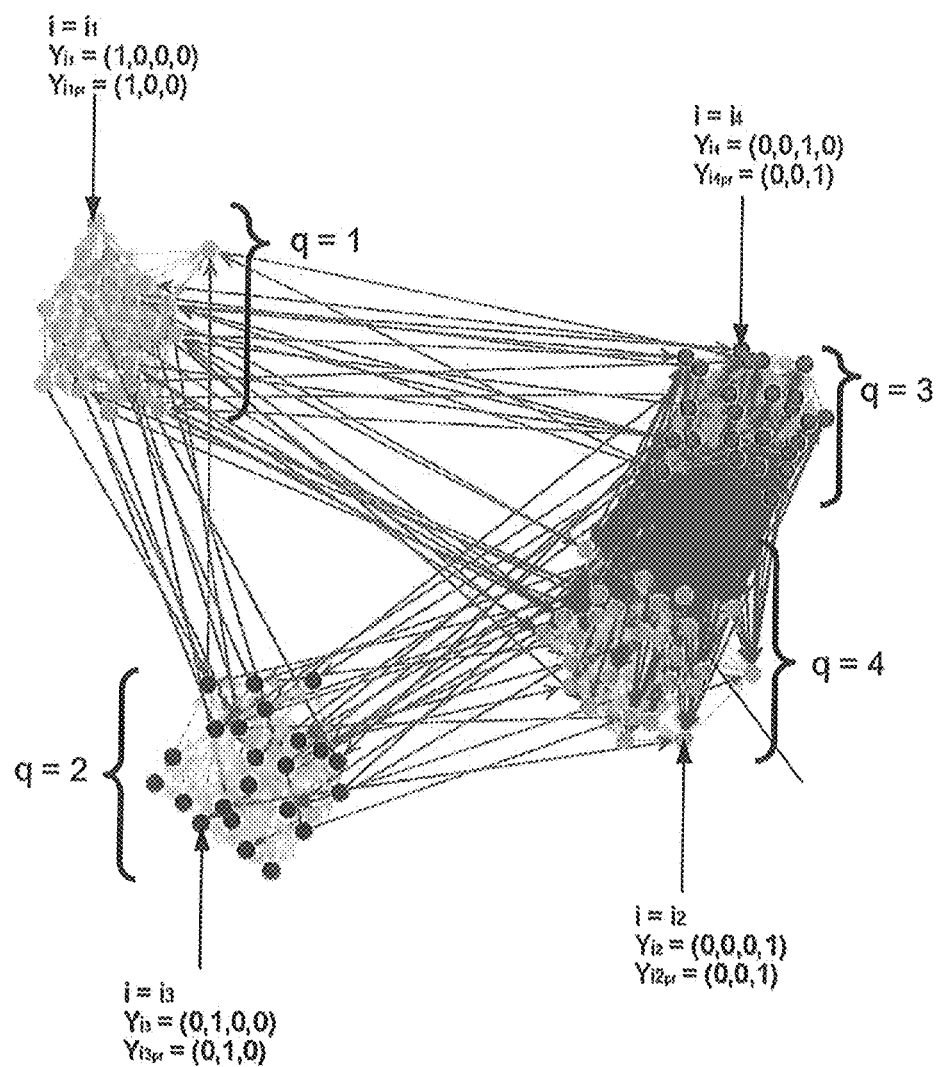
FIG. 7 displays, for the same network example as illustrated in FIG. 1, a similar exemplary graphical representation as in FIG. 1, that is however obtained through the specific method of FIG. 6.

The C-VEM algorithm for STBM was run on this exemplary network with the actual number of groups and topics (the problem of model selection is not considered for this particular experiment). The shown results were therefore obtained with clustering method 10, with input values of a number of groups Q=4 and a number of topics K=3, without looking to optimize said hyper-parameters. FIG. 7 is a graphical representation of the inference results of clustering method 10 for said optimized values of hyper-parameters. Clusters are represented by compact groups of nodes, whereas topics are displayed by the colors of the arrows representative of edges $A_{ij}$ between nodes. The three colors pink, yellow and red respectively correspond to topics 1, 2 and 3. Colors of the nodes correspond to the clusters. The four colors light green, dark blue, dark green and light blue respectively correspond to clusters 1, 2, 3 and 4.

As a comparison with previously mentioned clustering results shown in FIG. 1, for four particular nodes of this exemplary textual network:

node $i_1$ is still clustered into cluster 1, which corresponds to cluster 1 of FIG. 1;
node $i_3$ is still clustered into cluster 2, which corresponds to cluster 2 of FIG. 1.

However, nodes $i_2$ and $i_4$ are no longer clustered into the same cluster, conversely to results of a clustering method of the prior art as shown in FIG. 1:

node $i_2$ is clustered into cluster 4, within which nodes are linked by text data having majority topic 2;
node $i_4$ is clustered into cluster 3, within which nodes are linked by text data having majority topic 1.

Figure 8A:
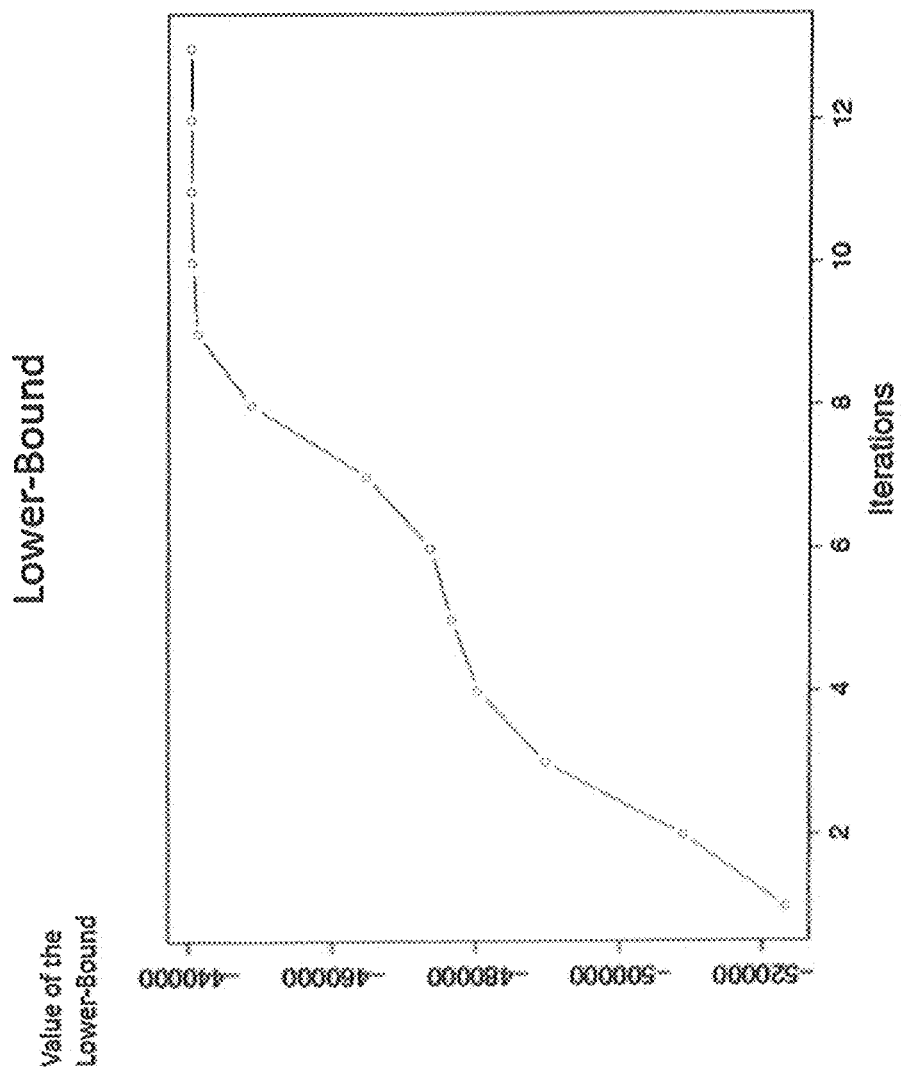
FIG. 8a displays values of lower-bound function to be maximized over the method of FIG. 6, as a function of the number of iterations of step 200 of FIG. 3, for the example of FIG. 7.
Figure 8B:
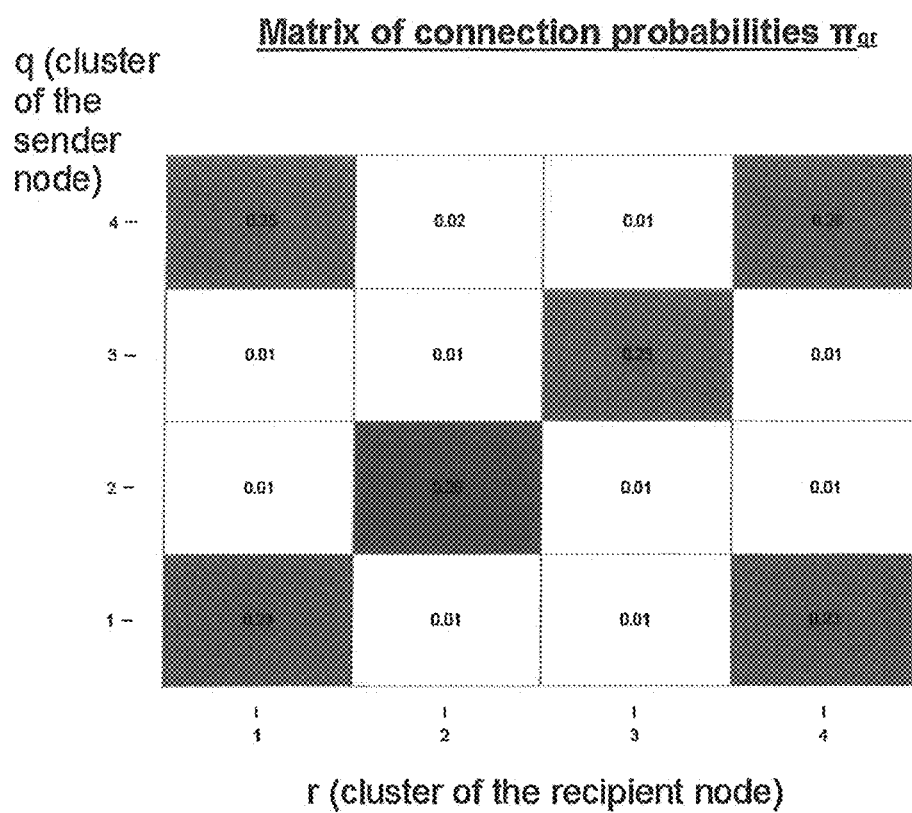
FIG. 8b shows a matrix of probabilities of connection between two nodes of the clusters of the example of FIG. 7.
Figure 8D:
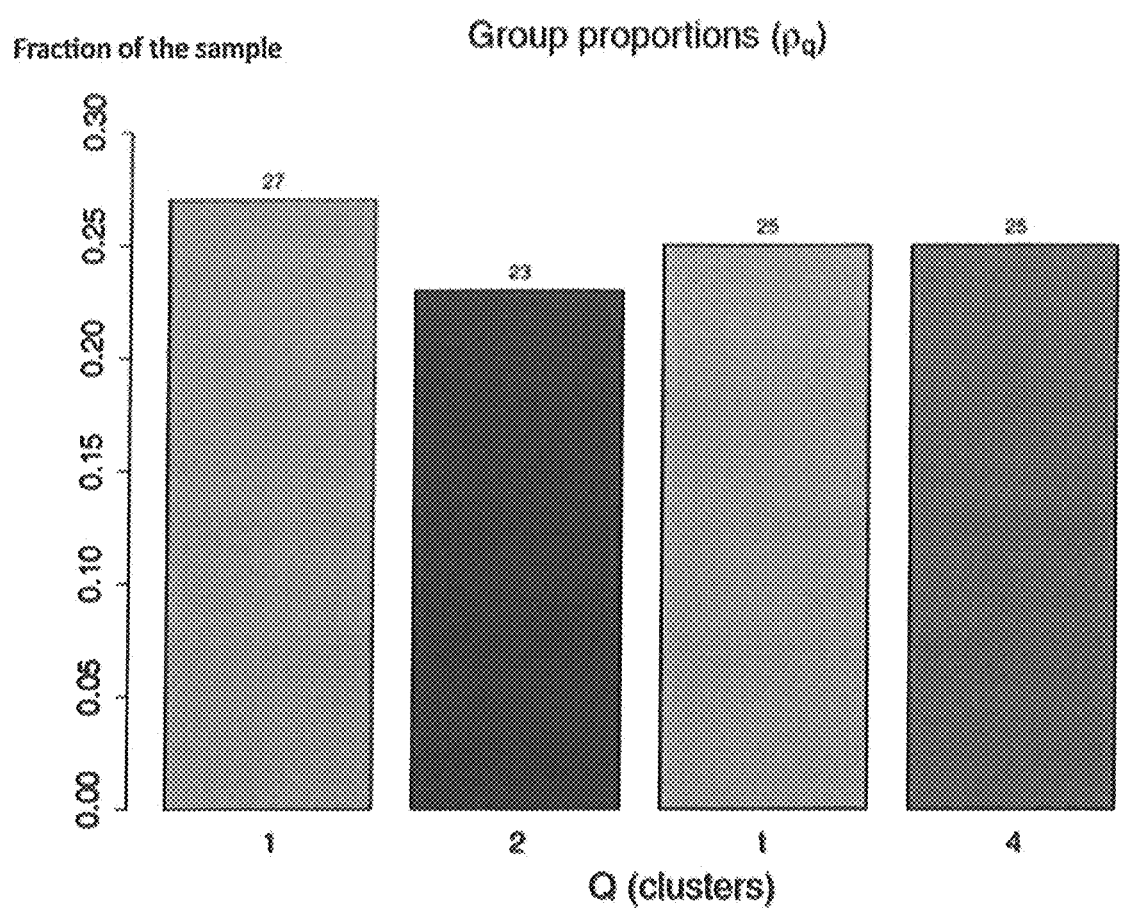
FIG. 8d displays the results obtained in terms of cluster proportions for the example of FIG. 7.

FIG. 8a allows to visualize the evolution of the lower bound L along the iterations of the inference step 200. FIG. 8b provides a view of the corresponding connection probabilities $\pi_{qr}$ between clusters, and shows that the pairs of nodes of distinct clusters that are most likely to be linked in the network are nodes of clusters 1 and 4. FIG. 8c displays the most frequent words in the 3 inferred topics, showing for each topic k, the ten words corresponding to highest probabilities $\beta_{kv}$. FIG. 8d displays the obtained cluster proportions $\rho_q$. All four figures must be read in relation with the table of description of Example 1 and FIG. 1 above, which contains the real parameters for the data set of Example 1. It turns out that both STBM model parameters and topic meanings are well recovered. STBM indeed perfectly recovers the three themes that we used for simulating the textual edges: one is a "royal baby" topic, one is a political one, and the last one is focused on Physics. Notice also that this result was obtained in only a few iterations of the C-VEM algorithm of clustering method 10.

Figure 9:
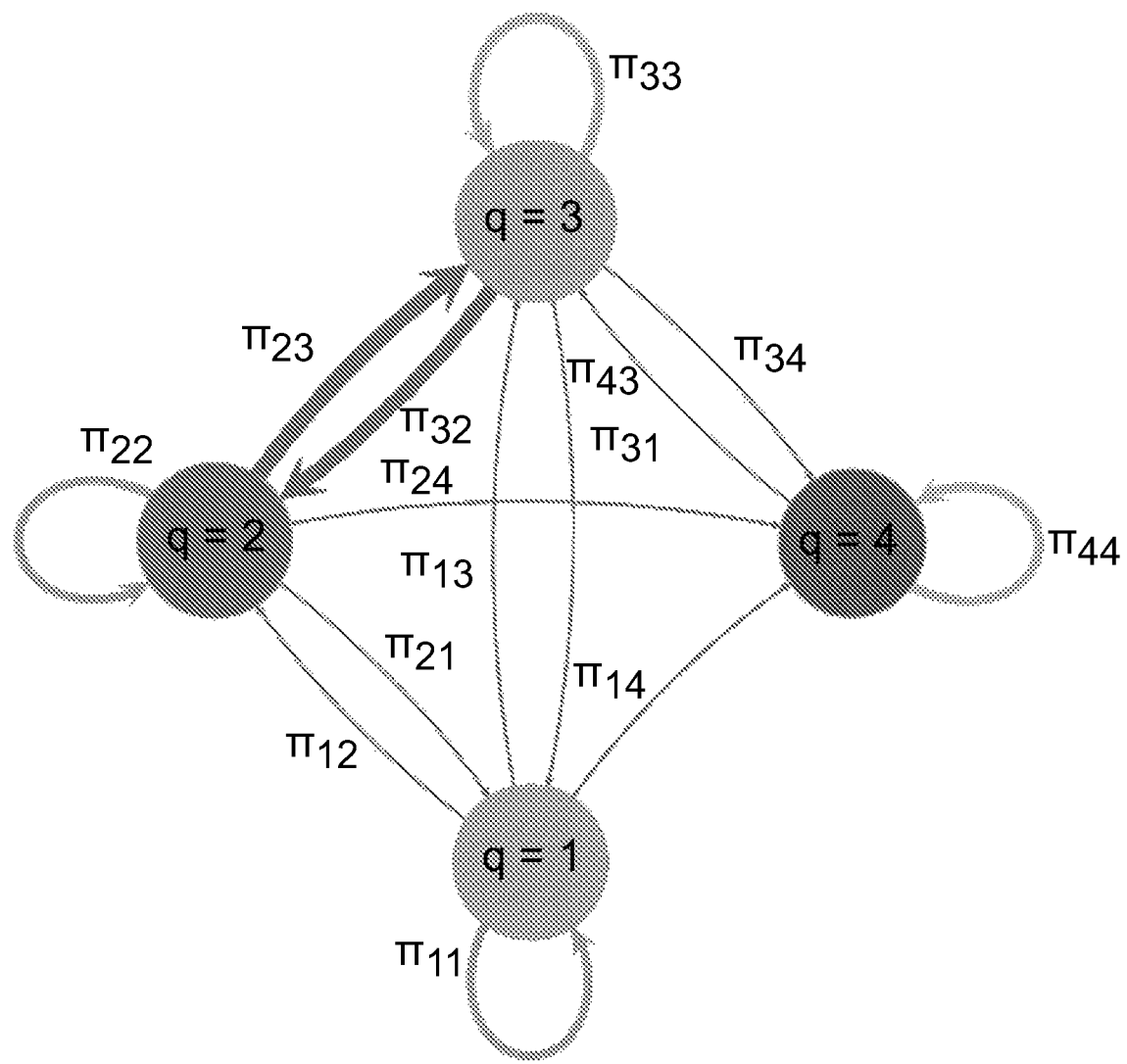
FIG. 9 displays an alternate representation of the results shown in FIG. 7, in the form of a meta-network.

A useful and compact view of both parameters $\pi$ and $\rho$, and of the most probable topics for group interactions, is visible in FIG. 9 which displays clustering results in the form of a meta-network. Here, node circles correspond to clusters q, and not individual nodes i. Edge widths correspond to connection probabilities between groups ($\pi_{qr}$), node sizes are proportional to group proportions ($\rho_q$), node color for a cluster q corresponds to the majority topic in documents sent between nodes of the same cluster q, and edge colors indicate the majority topics for group interactions between nodes that belong to distinct clusters. It is important to notice that, even though only the most probable topic is displayed here, each textual edge may use different topics.

EXAMPLE 2

Enron Data Set of Exchanged E-mails

Figure 10:
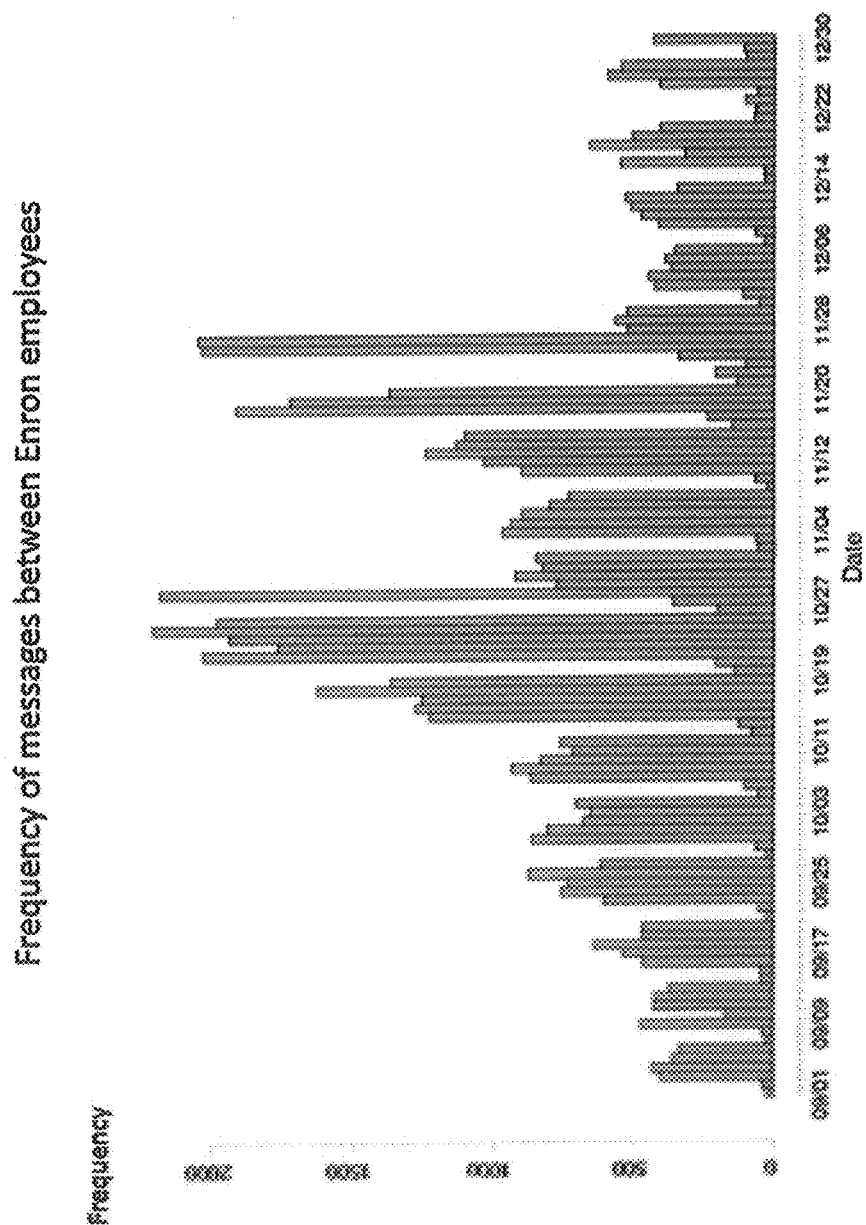
FIG. 10, which corresponds to another example of textual network compared to all aforementioned drawings (e-mails exchanged over the year 2002 in the Enron firm), displays the frequency of e-mail exchanges within Enron according to date of communication.

In Example 2, we consider here a classical communication network, the Enron data set, which contains all email communications between 149 employees of the famous company from 1999 to 2002. Here, we focus on the period 1, September to 31 Dec. 2001. FIG. 10 represents the number of email communications contained in the dataset of Example 2 for each date in this time window. We chose this specific time window because it is the denser period in term of sent emails and since it corresponds to a critical period for the company. Indeed, after the announcement early September 2001 that the company was "in the strongest and best shape that it has ever been in", the Securities and Exchange Commission (SEC) opened an investigation on 31 October for fraud and the company finally filed for bankruptcy on 2 Dec. 2001. By this time, it was the largest bankruptcy in the U.S. history and resulted in more than 4,000 lost jobs. Unsurprisingly, those key dates actually correspond to breaks in the email activity of the company.

The dataset considered here contains 20 940 emails sent between the M=149 employees. All messages sent between two individuals were coerced in a single meta-message. Thus, we end up with a dataset of 1 234 directed edges between employees, each edge carrying the text of all messages between two persons.

Figure 11:
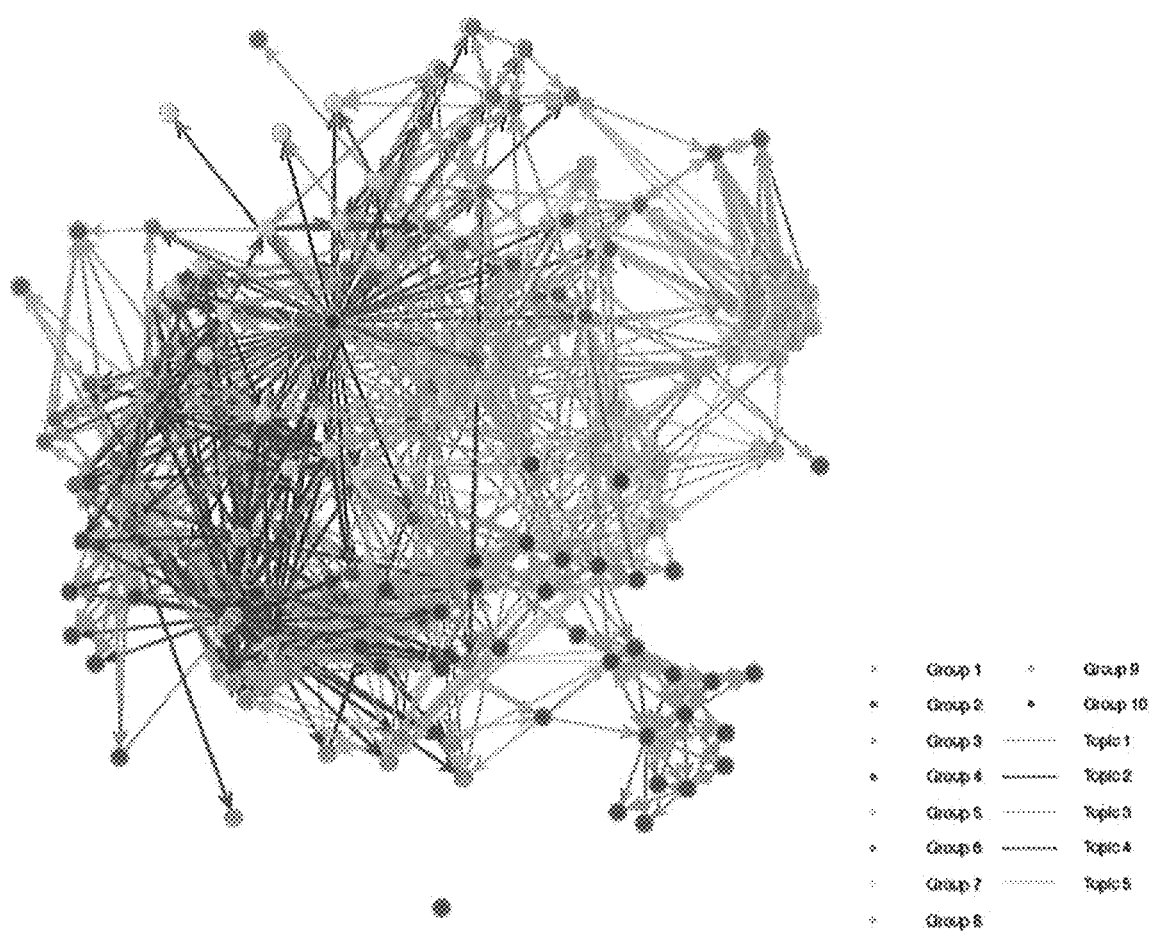
FIG. 11 gives a representation of the clustering obtained as a result of the method of FIG. 6, for the same Enron e-mail data set.

The C-VEM algorithm, according to method 1 as described above, was run on these data for a number Q of groups from 1 to 14 and a number K of topics from 2 to 20. The maximum value of quality criterion $ICL_{STBM}$ was obtained for (Q*, K*)=(10, 5). FIG. 11 gives a graphical representation, with the same graphical conventions as previously described FIG. 7, of the results of method 1, i.e. the optimized clustering obtained with STBM for said values (Q*, K*) of the hyper-parameters, corresponding to 10 groups of nodes and 5 topics.

As previously shown, edge colors refer to the majority topics for the communications between the individuals. The found topics can be easily interpreted by looking at the most specific words of each topic, displayed in FIG. 12 with same convention as previously described FIG. 8c.

In a few words, we can summarize the inferred topics as follows:

Topic 1 seems to refer to the financial and trading activities of Enron;
Topic 2 is concerned with Enron activities in Afghanistan (Enron and the Bush administration were suspected to work secretly with Talibans up to a few weeks before the 9/11 attacks);
Topic 3 contains elements related to the California electricity crisis, in which Enron was involved, and which almost caused the bankruptcy of SCE-corp (Southern California Edison Corporation) in early 2001;
Topic 4 is about usual logistic issues (building equipment, computers, etc.);
Topic 5 refers to technical discussions on gas deliveries (mmBTU represents 1 million of British thermal unit, which is equal to 1055 joules).

Figure 13:
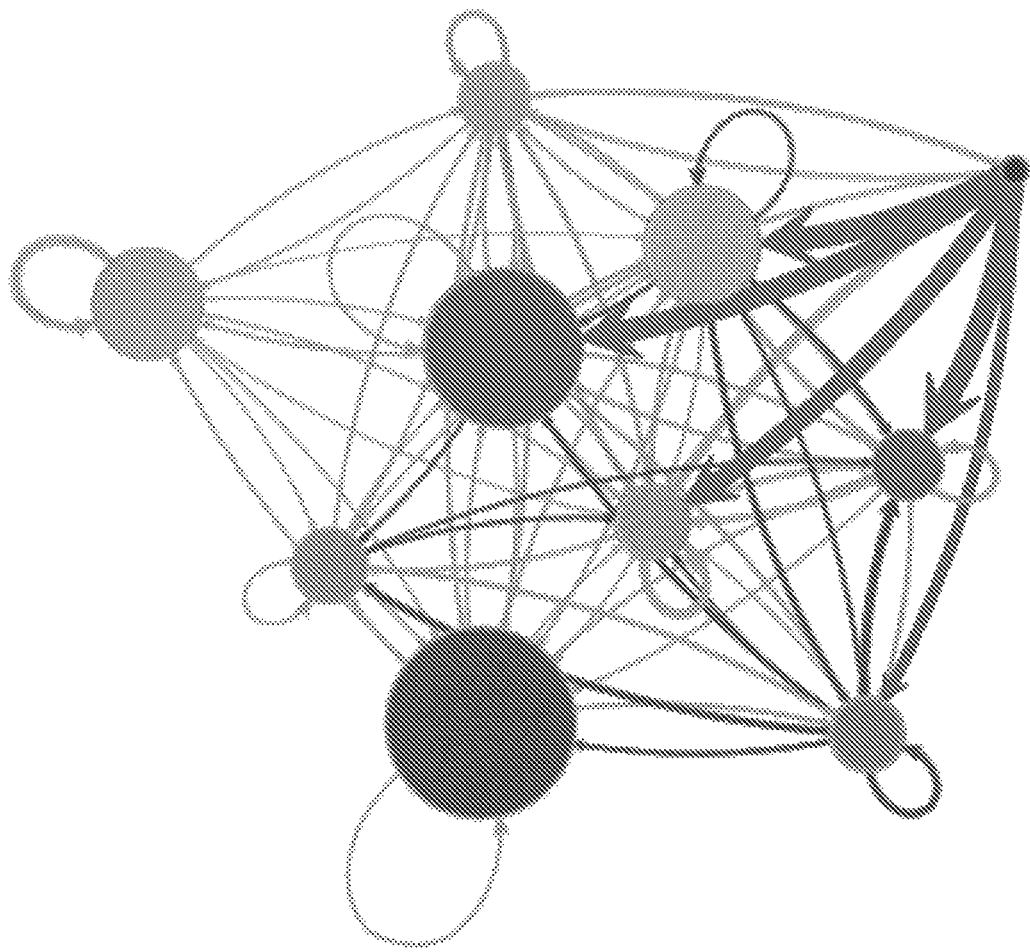
FIG. 13 displays an alternate representation of the results shown in FIG. 11, in the form of a meta-network.

FIG. 13 is a representation, in the form of a meta-network similar to the meta-network of FIG. 9 for Example 1, of the connection probabilities between inferred clusters (the estimated π matrix) and of the majority topics for group interactions. A few elements can be highlighted in view of this summary. First, group 10 contains a single individual who has a central place in the network and who mostly discusses about logistic issues (topic 4) with groups 4, 5, 6, and 7. Second, group 8 is made of 6 individuals who mainly communicate about Enron activities in Afghanistan (topic 2) between them and with other groups.

Finally, groups 4 and 6 seem to be more focused on trading activities (topic 1), whereas groups 1, 3, and 9 are dealing with technical issues on gas deliveries (topic 5).

Figure 14A:
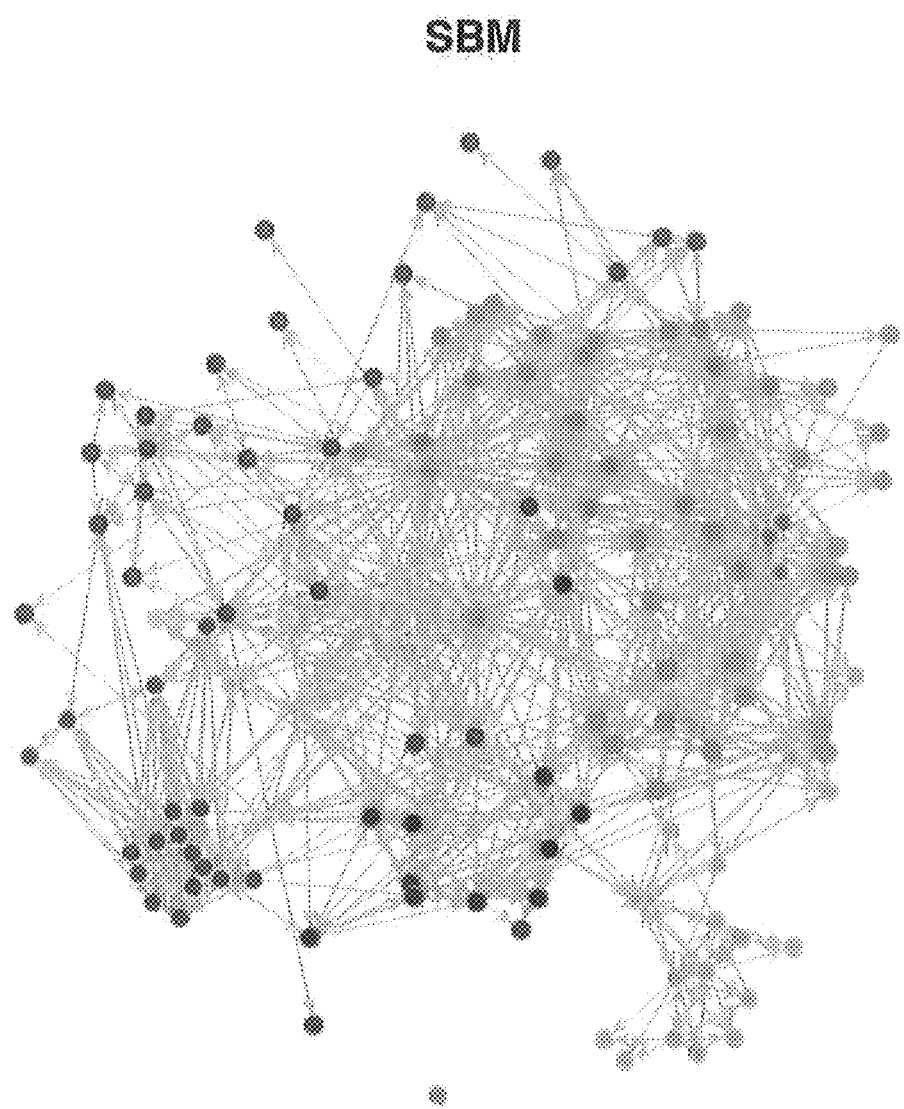
FIG. 14a displays clustering results obtained, for the same Enron data set, with a prior art clustering method based on a SBM model, with binary edges.
Figure 14B:
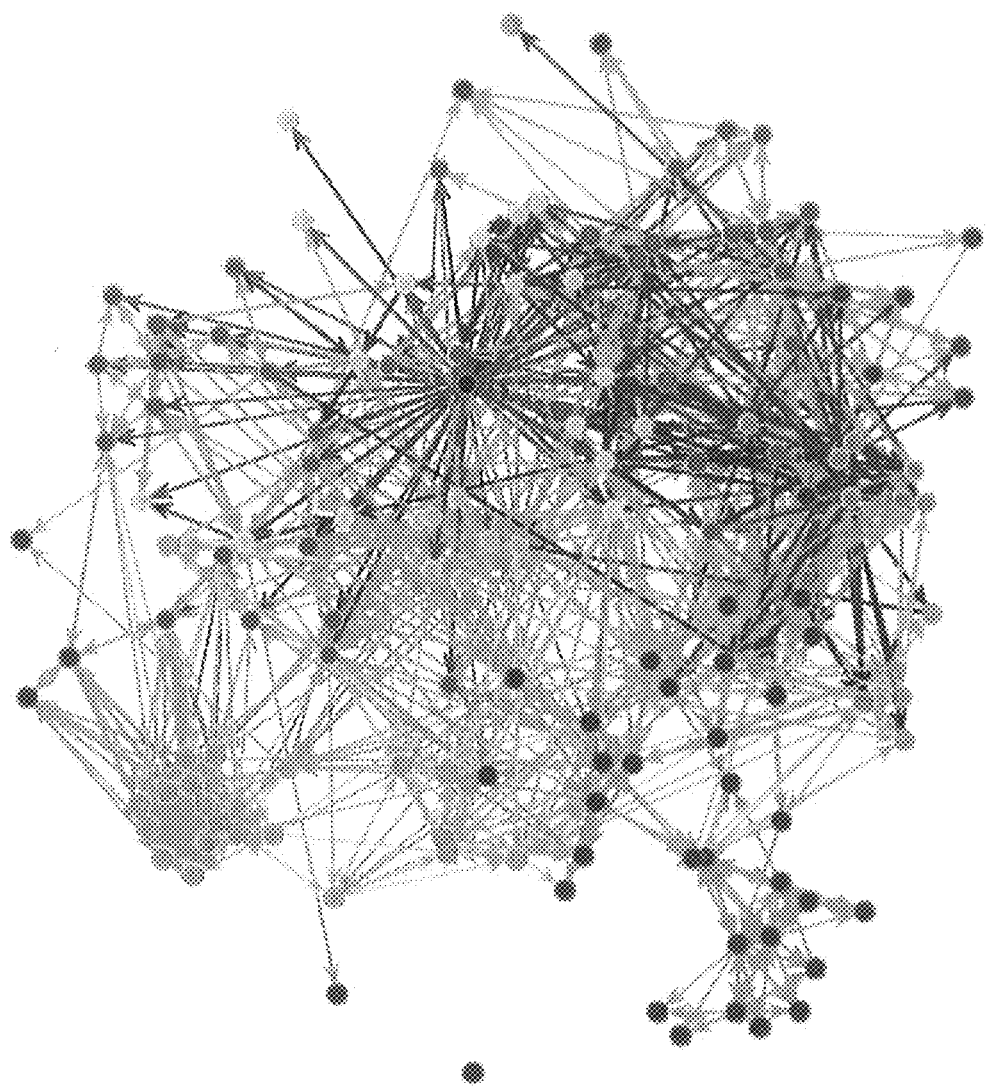
FIG. 14b displays clustering results obtained for the same Enron data set, with the clustering method of FIG. 6 using a STBM model.

As a comparison, the network has also been processed with SBM, using the mixer package (Ambroise et al. 2010)[20]. The chosen number K of groups by SBM was 8. FIGS. 14a and 14b allow to compare the partitions of nodes provided by a SBM model of the prior art, and a STBM model. One can observe that the two partitions differ on several points. On the one hand, some clusters found by SBM (the bottom-left one for instance) have been split by STBM since some nodes use different topics than the rest of the community. On the other hand, SBM isolates two "hubs" which seem to have similar behaviors. Conversely, STBM identifies a unique "hub" and the second node is gathered with other nodes, using similar discussion topics. STBM has therefore allowed a better and deeper understanding of the Enron network through the combination of text contents with network structure.

Figure 6:
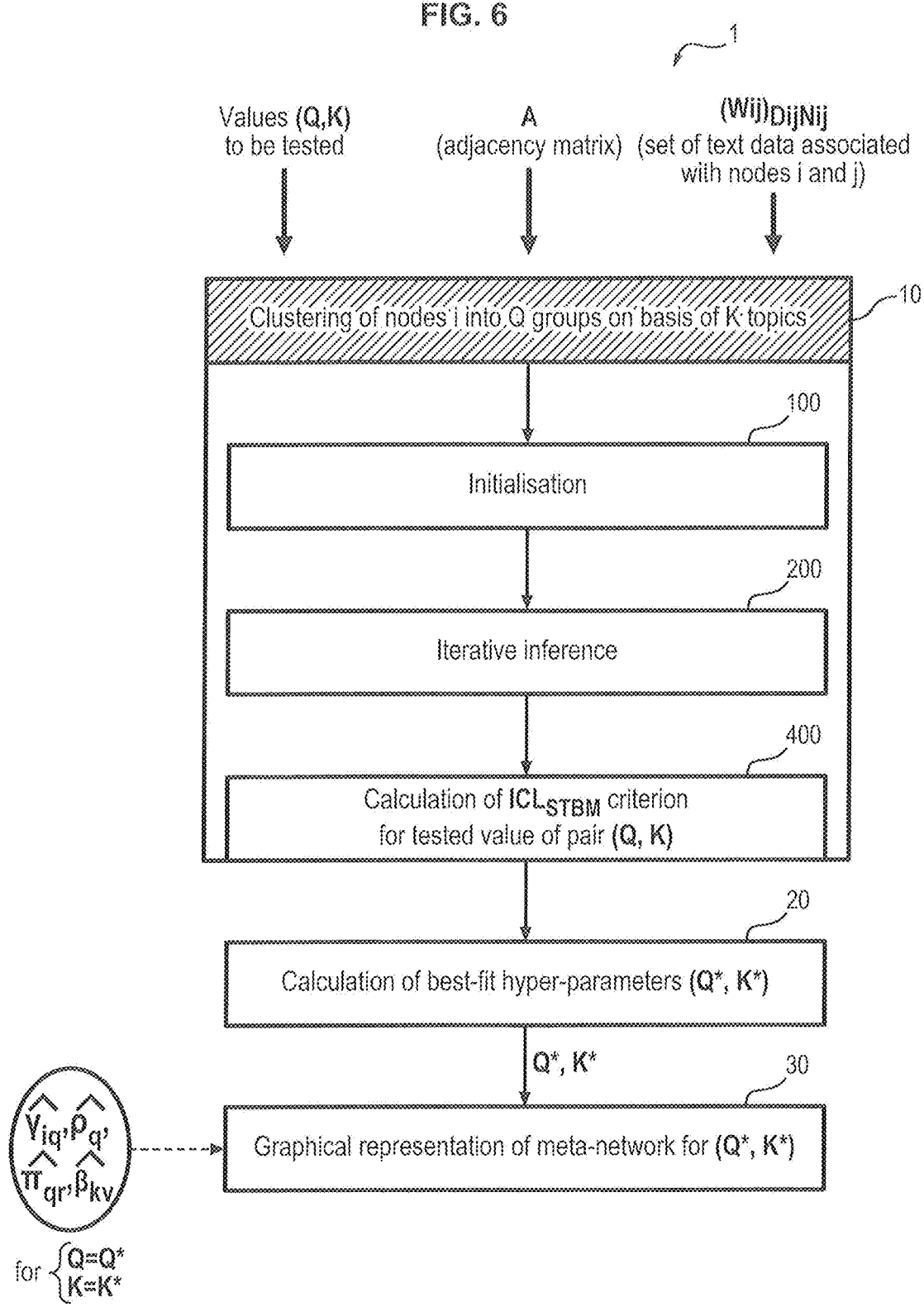
FIG. 6 displays, in the form of a schematic flow chart, an embodiment of a method for finding best-fit parameters for a given textual network, said method including several repetitions of several steps of the method of the embodiment of FIG. 3.
Figure 15:
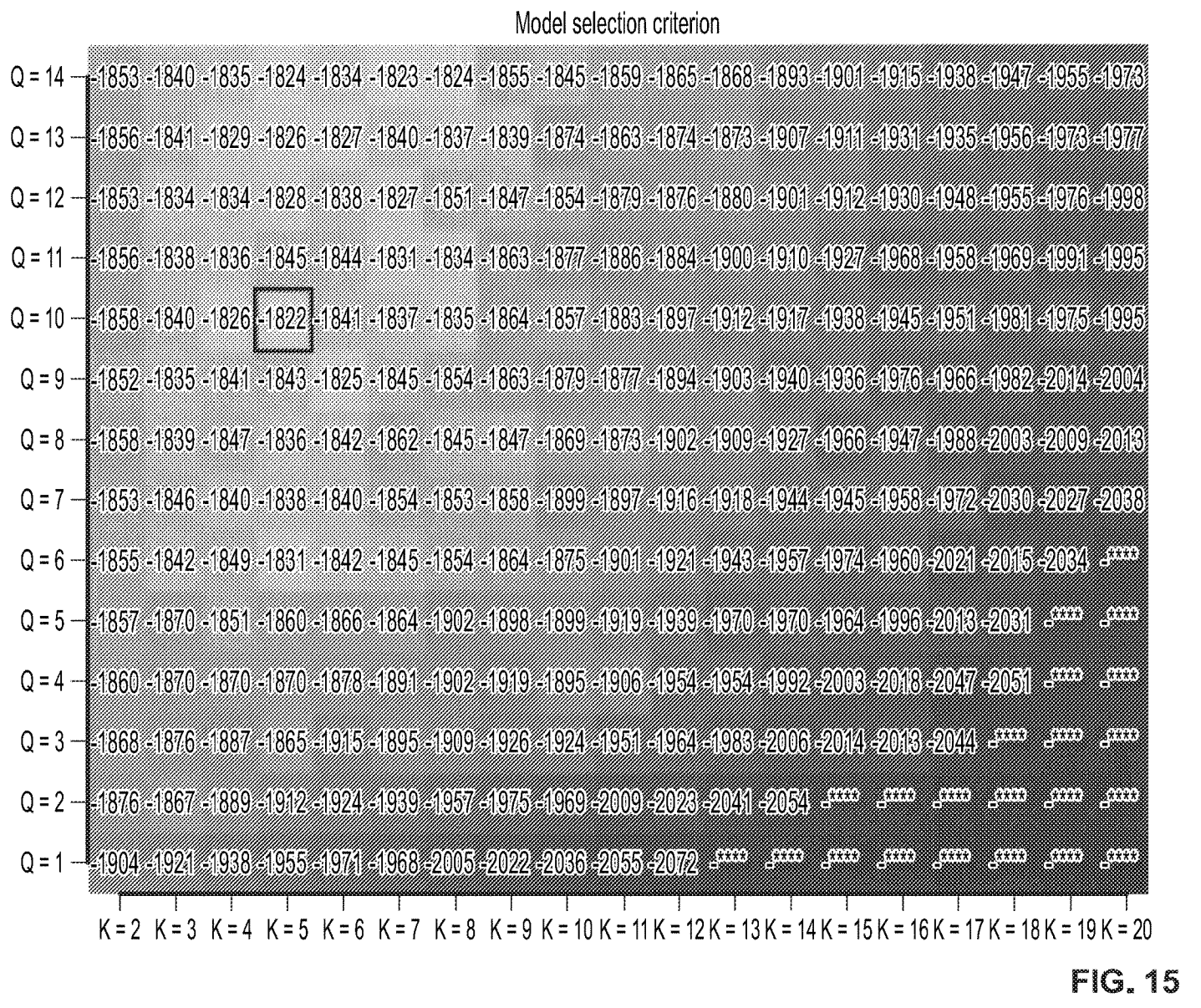

As shown in FIG. 15, which depicts the values of criterion $ICL_{STBM}$ described above for finding optimized hyper-parameters, calculated in step 400 displayed in FIG. 6 for all tested values (Q, K) for the Enron data set of Example 2, the model with the highest value was (Q*, K*)=(10, 5).

Figure 16:
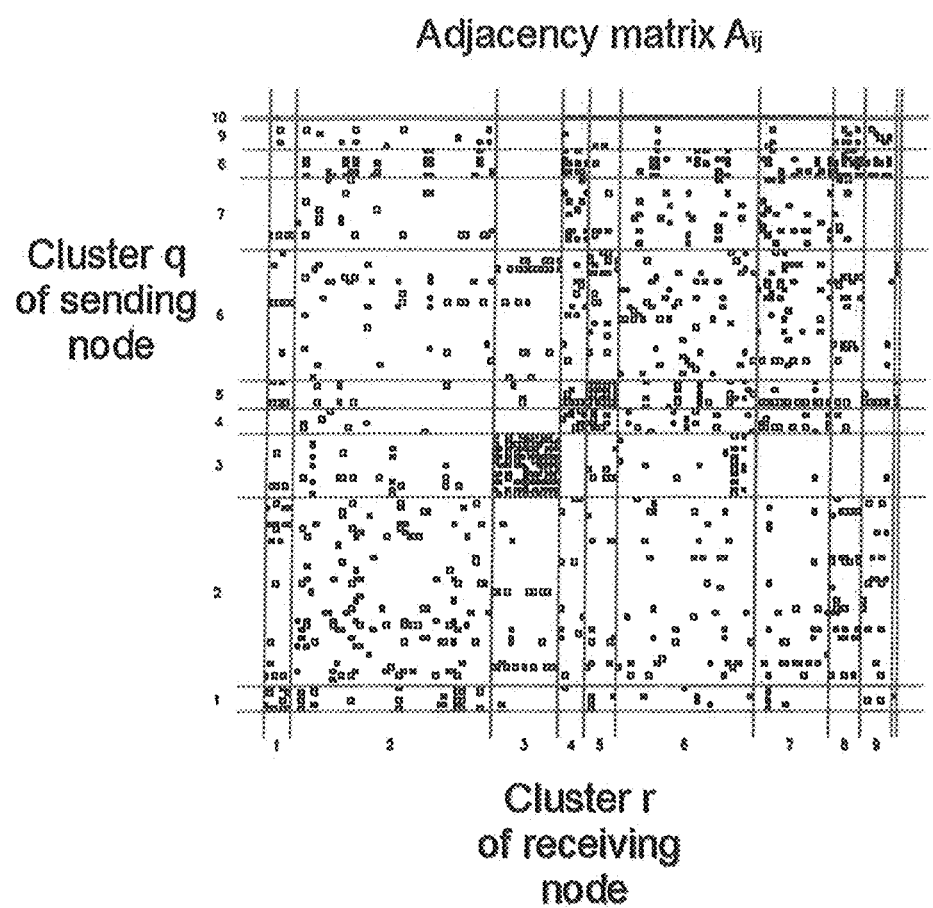
FIG. 16 schematically represents an adjacency matrix $A=(A_{ij})$ obtained for the nodes of the Enron data set, wherein the nodes are regrouped by their determined clusters.

FIG. 16 displays the adjacency matrix $A=(A_{ij})$ obtained for the nodes of the Enron data set of Example 2. One point corresponds to existence of an edge $A_{ij}$ sent from node i to node j (i.e. existence in the data set of Example 2 of an email from sender i to recipient j). The rows and the columns correspond to cluster of the sending node and cluster of the receiving node respectively. The colors of the points correspond to the majority topic in the text corresponding to the email.

EXAMPLE 3

Nips Data Set of Co-authored Publications

This second network is a co-authorship network within a scientific conference: the Neural Information Processing Systems (Nips) conference. The conference was initially mainly focused on computational neurosciences and is nowadays one of the famous conferences in statistical learning and artificial intelligence. We hereby consider the data between the 1988 and 2003 editions (Nips 1-17). The dataset contains the abstracts of 2484 accepted papers from 2740 contributing authors.

Figure 17:
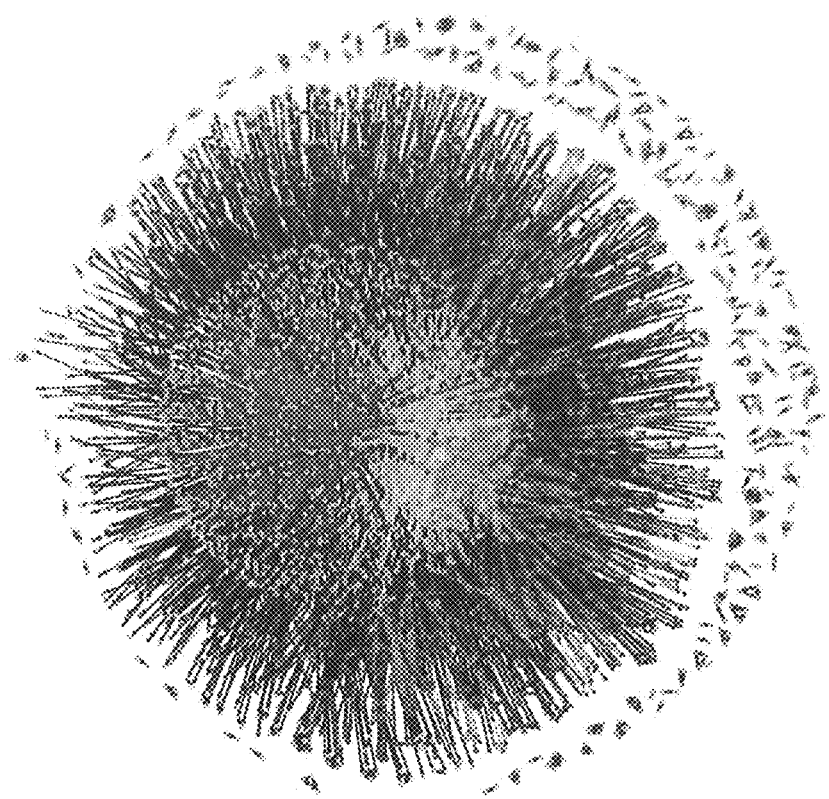
FIG. 17 gives a representation of the clustering obtained as a result of the method of FIG. 6, applied to another data set compared to the aforementioned drawings, namely a "Nips" co-authorship network.
Figure 18:
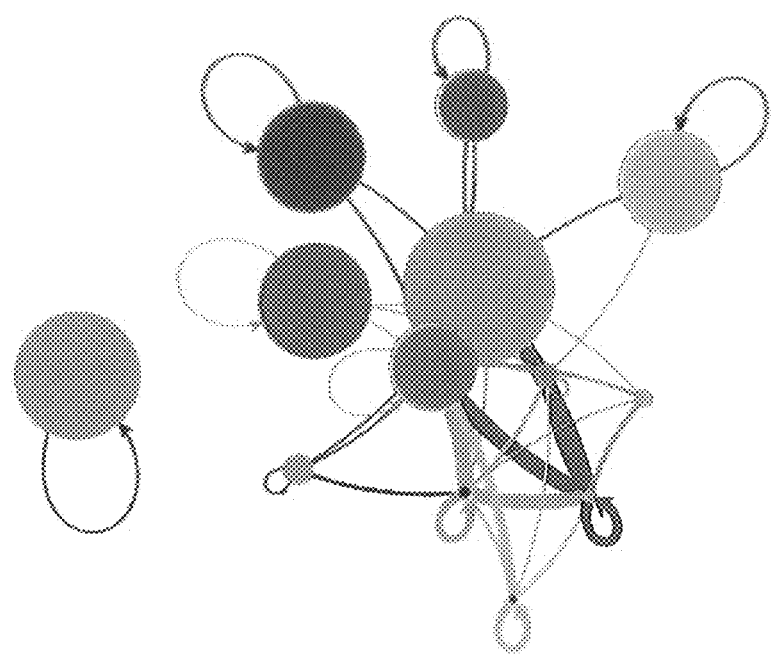
FIG. 18 displays an alternate representation of the results shown in FIG. 17, in the form of a meta-network.

The vocabulary used in the paper abstracts has 14,036 words. Once the co-authorship network reconstructed, we have an undirected network between 2740 authors with 22,640 textual edges. The data set that is considered in Example 3 therefore corresponds to an undirected network, seeing as an edge Aij of said data set does not correspond to a text sent from node i to node j, but corresponds to a set Wij of documents co-authored by authors i and j (without asymmetry between i and j). This is in contrast to the data sets of Example 1 and Example 2, We applied STBM on the large dataset of Example 3, and the selected model by ICL was (Q, K)=(13, 7). We found ICL to have higher values for K≤Q on this dataset. It is worth noticing that STBM chose here a limited number of topics compared to what a simple LDA analysis of the data would have provided. Indeed, STBM looks for topics which are useful for clustering the nodes. In this sense, the topics of STBM may be slightly different than those of LDA. FIG. 17 shows the clustering obtained with STBM for 13 groups of nodes and 7 topics. Due to size and density of the network, the visualization and interpretation from this figure are actually tricky. The meta-network view of the network shown in FIG. 18 is of a greater help and allows to get a clear idea of the network organization. To this end, it is necessary to first picture out the meaning of the found topics, that are displayed in the representation of FIG. 19:

Topic 1 seems to be focused on neural network theory, which was and still is a central topic in Nips.

Topic 2 is concerned with phoneme classification or recognition,

Topic 3 is a more general topic about statistical learning and artificial intelligence.

Topic 4 is about Neuroscience and focuses on experimental works about the visual cortex.

Topic 5 deals with network learning theory.

Topic 6 is also about Neuroscience but seems to be more focused on EEG.

Topic 7 is finally devoted to neural coding, i.e., characterizing the relationship between the stimulus and the individual responses.

In light of these interpretations, we can eventually comment some specific relationships between groups. First of all, we have an obvious community (group 1) which is disconnected with the rest of the network and which is focused on neural coding (topic 7). One can also clearly identify in FIG. 18 that groups 2, 5, and 10 are three "hubs" of a few individuals. Group 2 seems to mainly work on the visual cortex understanding, whereas group 10 is focused on phoneme analysis. Group 5 is mainly concerned with the general neural network theory but has also collaborations in phoneme analysis. From a more general point of view, topics 6 and 7 seem to be popular themes in the network. Notice that group 3 has a specific behavior in the network since people in this cluster publish preferentially with people in other groups than together. This is the exact definition of a disassortative cluster. It is also of interest to notice that statistical learning and artificial intelligence (which are probably now 90% of the submissions at Nips) were not yet by this time proper topics. They were probably used more as tools in phoneme recognition studies and EEG analyses. This is confirmed by the fact that words used in topic 3 are less specific to the topic and are frequently used in other topics as well.

As a conclusive remark on the network of Example 3, STBM has proved its ability to bring out concise and relevant analyses on the structure of a large and dense network. In this view, the meta-network of FIG. 18 is a great help since it summarizes several model parameters of STBM.

APPENDIX

Appendix 1: Optimization of R(Z)

The VEM update step for each distribution $R(Z_{ij}^{dn})$, $A_{ij}=1$, is given by $$\log R(Z_{ij}^{dn}) = E_{Z\setminus i,j,d,n,\theta}[\log p(W \mid A, Z, \beta) + \log p(Z \mid A, Y, \theta)] + \text{const} \quad (9)$$

$$= \sum_{k=1}^{K} Z_{ij}^{dnk} \sum_{v=1}^{V} W_{ij}^{dnv} \log \beta_{kv} +$$

$$\sum_{q,r}^{Q} Y_{iq} Y_{jr} \sum_{k=1}^{K} Z_{ij}^{dnk} E_{\theta_{qr}}[\log \theta_{qrk}] + \text{const}$$

$$= \sum_{k=1}^{K} Z_{ij}^{dnk} \left( \sum_{v=1}^{V} W_{ij}^{dnv} \log \beta_{kv} + \right.$$

$$\left. \sum_{q,r}^{Q} Y_{iq} Y_{jr} \left( \psi(\gamma_{qrk}) - \psi\left(\sum_{k=1}^{K} \gamma_{qrk}\right) \right) \right) + \text{const},$$

where all terms that do not depend on $Z_{ij}^{dn}$ have been put into the constant term const. Moreover, $\psi(\bullet)$ denotes the digamma function. The functional form of a multinomial distribution is then recognized in (9)

$$R(Z_{ij}^{dn}) = \mathcal{M}(Z_{ij}^{dn}; 1, \phi_{ij}^{dn} = (\phi_{ij}^{dn1}, \ldots, \phi_{ij}^{dnK})),$$

where $$\phi_{ij}^{dnk} \propto \left( \prod_{v=1}^{V} \beta_{kv}^{W_{ij}^{dnv}} \right) \prod_{q,r}^{Q} \exp\left( \psi\left( \gamma_{qrk} - \psi\left( \sum_{j=1}^{K} \gamma_{qrt} \right) \right) \right)^{Y_{iq} Y_{jr}}.$$

$\phi_{ij}^{dnk}$ is the (approximate) posterior distribution of words $W_{ij}^{dn}$ being in topic k.

Appendix 2: Optimization of $R(\theta)$

The VEM update step for distribution $R(\theta)$ is given by $$\log R(\theta) = E_Z[\log p(Z \mid A, Y, \theta)] + \text{const}$$

$$= \sum_{i \neq j}^{M} A_{ij} \sum_{d=1}^{D_{ij}} \sum_{n=1}^{N_{ij}^d} \sum_{q,r}^{Q} Y_{iq} Y_{jr} \times$$

$$\sum_{k=1}^{K} E_{Z_{ij}^{dn}}[Z_{ij}^{dnk}] \log \theta_{qrk} +$$

$$\sum_{q,r}^{Q} \sum_{k=1}^{K} (\alpha_k - 1) \log \theta_{qrk} + \text{const}$$

$$= \sum_{q,r}^{Q} \sum_{k=1}^{K} \left( \alpha_k + \sum_{i \neq j}^{M} A_{ij} Y_{iq} Y_{jr} \sum_{d=1}^{N_{ij}^d} \sum_{n=1}^{N_{ij}^{dn}} \phi_{ij}^{dnk} - 1 \right)$$

$$\log \theta_{qrk} + \text{const}.$$

We recognize the functional form of a product of Dirichlet distributions $$R(\theta) = \prod_{q,r}^{Q} \text{Dir}(\theta_{qr}; \gamma_{qr} = (\gamma_{qr1}, \ldots, \gamma_{qrK})),$$

where $$\gamma_{qrk} = \alpha_k + \sum_{i \neq j}^{M} A_{ij} Y_{iq} Y_{jr} \sum_{d=1}^{N_{ij}^d} \sum_{n=1}^{N_{ij}^{dn}} \phi_{ij}^{dnk}.$$

Appendix 3: Derivation of the Lower Bound $\tilde{\mathcal{L}}(R(\bullet); Y, \beta))$ The lower bound $\tilde{\mathcal{L}}(R(\hat{\ }); Y, \beta)$ in (7) is given by $$\tilde{\mathcal{L}}(R(\cdot); Y, \beta) = \sum_{Z} \int_{\theta} R(Z, \theta) \log \frac{p(W, Z, \theta \mid A, Y, \beta)}{R(Z, \theta)} d\theta$$

$$= E_Z[\log p(W \mid A, Z, \beta)] +$$

$$E_{Z,\theta}[\log p(Z \mid A, Y, \theta)] + E_{\theta}[\log p(\theta)] -$$

$$E_Z[\log R(Z)] - E_{\theta}[\log R(\theta)]$$

$$= \sum_{i \neq j}^{M} A_{ij} \sum_{d=1}^{D_{ij}} \sum_{n=1}^{N_{ij}^{d_n}} \sum_{k=1}^{K} \phi_{ij}^{dnk} \sum_{v=1}^{V} W_{ij}^{dnv} \log \beta_{kv} +$$

$$\sum_{i \neq j}^{M} A_{ij} \sum_{d=1}^{D_{ij}} \sum_{n=1}^{N_{ij}^{dn}} \sum_{q,r}^{Q} Y_{iq} Y_{jr} \times$$

$$\sum_{k=1}^{K} \phi_{ij}^{dnk} \left( \psi(\gamma_{qrk}) - \psi\left( \sum_{i=1}^{K} \gamma_{qrl} \right) \right) +$$

$$\sum_{q,r}^{Q} \left( \log \Gamma\left( \sum_{t=1}^{K} \alpha_k \right) - \sum_{i=1}^{K} \log \Gamma(\alpha_i) + \right.$$

$$\left. \sum_{k=1}^{K} (\alpha_k - 1) \left( \psi(\gamma_{qrk}) - \psi\left( \sum_{i=1}^{K} \gamma_{qrl} \right) \right) \right) -$$

$$\sum_{i \neq j}^{M} A_{ij} \sum_{d=1}^{D_{ij}} \sum_{n=k}^{N_{ij}^{dn}} \sum_{k=1}^{K} \phi_{ij}^{dnk} \log \phi_{ij}^{dnk} -$$

$$\sum_{q,r}^{Q} \left( \log \Gamma\left( \sum_{i=1}^{K} \gamma_{qrl} \right) - \sum_{i=1}^{K} \log \Gamma(\gamma_{qrl}) + \right.$$

$$\left. \sum_{k=1}^{K} (\gamma_{qrk} - 1) \left( \psi(\gamma_{qrk}) - \psi\left( \sum_{i=1}^{K} \gamma_{qrl} \right) \right) \right).$$

Appendix 4: Optimization of $\beta$

In order to maximize the lower bound $\tilde{\mathcal{L}}(R(\bullet); Y, \beta)$, we isolate the terms in (10) that depend on $\beta$ and add Lagrange multipliers to satisfy the constraints $\Sigma_{v=1}^{V} \beta_{kv} = 1$, $\forall k$ $$\tilde{\mathcal{L}}_B = \sum_{i \neq j}^{M} A_{ij} \sum_{d=1}^{D_{ij}} \sum_{n=1}^{N_{ij}^{dn}} \sum_{k=1}^{K} \phi_{ij}^{dnk} \sum_{v=1}^{V} W_{ij}^{dnv} \log \beta_{kv} + \sum_{k=1}^{K} \lambda_k \left( \sum_{v=1}^{V} \beta_{kv} - 1 \right).$$

Setting the derivative, with respect to $\beta_{kv}$, to zero, we find $$\beta_{kv} \propto \sum_{i \neq j}^{M} A_{ij} \sum_{d=1}^{D_{ij}} \sum_{n=1}^{N_{ij}^{dn}} \phi_{ij}^{dnk} W_{ij}^{dnv}.$$

Appendix 5: Optimization of $\rho$

Only the distribution $p(Y|\rho)$ in the complete data log-likelihood $\log p(A, Y|\rho, \pi)$ depends on the parameter vector $\rho$ of cluster proportions. Taking the log and adding a Lagrange multiplier to satisfy the constraint $\Sigma_{q=1}^{Q}\rho_q=1$, we have $$\log p(Y|\rho) = \sum_{i=1}^{M}\sum_{q=1}^{Q} Y_{iq}\log\rho_q.$$

Taking the derivative with respect $\rho$ to zero, we find $$\rho_q \propto \sum_{i=1}^{M} Y_{iq}.$$

Appendix 6: Optimization of $\pi$

Only the distribution $p(A|Y, \pi)$ in the complete data log-likelihood $\log p(A, Y|\rho, \pi)$ depends on the parameter matrix $\pi$ of connection probabilities. Taking the log we have $$\log p(A|Y, \pi) = \sum_{i\neq j}^{M}\sum_{q,r}^{Q} Y_{iq}Y_{jr}(A_{ij}\log\pi_{qr} + (1-A_{ij})\log(1-\pi_{qr})).$$

Taking the derivative with respect to $\pi_{qr}$ to zero, we obtain $$\pi_{qr} = \frac{\sum_{i\neq j}^{M}\sum_{q,r}^{Q} Y_{iq}Y_{jr}A_{ij}}{\sum_{i\neq j}^{M}\sum_{q,r}^{Q} Y_{iq}Y_{jr}}.$$

Appendix 7: Model Selection

Assuming that the prior distribution over the model parameters $(\rho, \pi, \beta)$ can be factorized. the integrated complete data log-likelihood $\log p(A, W, Y|K, Q)$ is given by $$\log p(A, W, Y|K, Q) = \log\int_{\rho,\pi,\beta} p(A, W, Y, \rho, \pi, \beta | K, Q)d\rho d\pi d\theta$$
$$= \log\int_{\rho,\pi,\beta} p(A, W, Y|\rho, \pi, \beta, K, Q)\times$$
$$p(\rho|Q)p(\pi|Q)p(\beta|K)d\rho d\pi d\beta.$$

Note that the dependency on K and Q is made explicit here, in all expressions. In all other sections of the paper, we did not include these terms to keep the notations uncluttered. We find $$\log p(A, W, Y|K, Q) = \log\int_{\rho,\pi,\beta}\left(\sum_Z \int_\theta p(A, W, Y, Z, \theta|\rho, \pi, \beta, K, Q)d\theta\right)\times \qquad (11)$$
$$p(\rho|Q)p(\pi|Q)p(\beta|K)d\rho d\pi d\beta$$
$$= \log\int_{\rho,\pi,\beta}\left(\sum_Z \int_\theta p(W, Z, \theta|A, Y, \beta, K, Q)p(A, Y|\rho, \pi, Q)d\theta\right)\times$$
$$p(\rho|Q)p(\pi|Q)p(\beta|K)d\rho d\pi d\beta$$
$$= \log\int_{\rho,\pi,\beta} p(W|A, Y, \beta, K, Q)p(A|Y, \pi, Q)p(Y|\rho, Q)\times$$
$$p(\rho|Q)p(\pi|Q)p(\beta|K)d\rho d\pi d\beta$$
$$= \log\int_\beta p(W|A, Y, \beta, K, Q)\times$$
$$p(\beta|K)d\beta + \log\int_\pi p(A|Y, \pi, Q)p(\pi|Q)d\pi + \log\int_\rho p(Y|\rho, Q)p(\rho|Q)d\rho.$$

Following the derivation of the ICL criterion, we apply a Laplace (BIC-like) approximation on the second term of Eq. (11). Moreover, considering a Jeffreys prior distribution for $\rho$ and using Stirling formula for large values of M, we obtain $$\log\int_\pi p(A|Y, \pi, Q)p(\pi|Q)d\pi \approx$$
$$\max_\pi \log p(A|Y, \pi, Q) - \frac{Q^2}{2}\log M(M-1),$$

as well as $$\log\int_\pi p(Y|\rho, Q)p(\rho|Q)d\rho \approx \max_\rho \log p(Y|\rho, Q) - \frac{Q-1}{2}\log M.$$

For more details, we refer to Biernacki et al. (2000)[18]. Furthermore, we emphasize that adding these two approximations leads to the ICL criterion for the SBM model, as derived by Daudin et al. (2008)[17]

$$ICL_{SBM} = \max_\pi \log p(A|Y, \pi, Q) -$$
$$\frac{Q^2}{2}\log M(M-1) + \max_\rho \log p(Y|\rho, Q) -$$
$$\frac{Q-1}{2}\log M$$
$$= \max_{\rho,\pi} \log p(A, Y|\rho, \pi, Q) -$$
$$\frac{Q^2}{2}\log M(M-1) - \frac{Q-1}{2}\log M.$$

In Daudin et al. (2008)[17], M(M−1) is replaced by M(M−1)/2 and $Q^2$ by Q(Q+1)/2 since they considered undirected networks.

Now, it is worth taking a closer look at the first term of Eq. (11). This term involves a marginalization over $\beta$. Let us emphasize that $p(W|A, Y, \beta, K, Q)$ is related to the LDA model and involves a marginalization over $\theta$ (and Z). Because we aim at approximating the first term of Eq. (11), also with a Laplace (BIC-like) approximation, it is crucial to identify the number of observations in the associated likelihood term p(W|A, Y, β, K, Q).

given Y (and θ), it is possible to reorganize the documents in W as W=($\tilde{W}_{qr}$)$_{qr}$ is such a way that all words in $\tilde{W}_{qr}$ follow the same mixture distribution over topics. Each aggregated document $\tilde{W}_{qr}$ has its own vector θ$_{qr}$ of topic proportions and since the distribution over θ factorizes (p(θ)=Π$_{q,r}$$^Q$p(θ$_{qr}$)), we find $$p(W \mid A, Y, \beta, K, Q) = \int_\theta p(W \mid A, Y, \theta, \beta, K, Q) p(\theta \mid K, Q) d\theta$$

$$= \prod_{q=r}^{Q} \int_{\theta_{qr}} p(\tilde{W}_{qr} \mid \theta_{qr}, \beta, K, Q) p(\theta_{qr} \mid K) d\theta_{qr}$$

$$= \prod_{q,r}^{Q} \ell(\tilde{W}_{qr} \mid \beta, K, Q),$$

where l($\tilde{W}_{qr}$|β, K, Q) is exactly the likelihood term of the LDA model associated with document $\tilde{W}$qr, as described in Blei et al. (2003)[6]. Thus $$\log \int_\beta p(W \mid A, Y, \beta, K, Q) p(\beta \mid K) d\beta = \quad (12)$$

$$\log \int_\beta p(\beta \mid K) \prod_{q,r}^{Q} \ell(\tilde{W}_{qr} \mid \beta, K, Q) d\beta.$$

Applying a Laplace approximation on Eq. (12) is then equivalent to deriving a BIC-like criterion for the LDA model with documents in W=($\tilde{W}_{qr}$)$_{qr}$. In the LDA model, the number of observations in the penalization term of BIC is the number of documents [see Than and Ho (2012)[19] for instance]. In our case, this leads to $$\log \int_\beta p(W \mid A, Y, \beta, K, Q) p(\beta \mid K) d\beta \approx \quad (13)$$

$$\max_\beta \log p(W \mid A, Y, \beta, K, Q) - \frac{K(V-1)}{2} \log Q^2.$$

Unfortunately, log p(W|A, Y, β, K, Q) is not tractable and so we propose to replace it with its variational approximation $\tilde{\mathcal{L}}$, after convergence of the C-VEM algorithm. By analogy with ICL$_{SBM}$, we call the corresponding criterion BIC$_{LDA|Y}$ such that $$\log p(A, W, Y \mid K, Q) \approx BIC_{LDA|Y} + ICL_{SBM}.$$

The invention claimed is:

1. A computer-implemented method for clustering nodes of a communications network, said communications network comprising a number M of nodes, nodes i,j being associated with edges A$_{ij}$ of an adjacency matrix A,
 a message edge W$_{ij}$ of text data by edge A$_{ij}$,
 the message edge W$_{ij}$ being a vector W$_{ij}$ =(W$_{ij}$$^1$, . . . , W$_{ij}$$^d$, . . . , W$_{ij}$$^{Dij}$), wherein D$_{ij}$ is a number of text documents exchanged between the node i and the node j, where W$_{ij}$$^d$ is at least one set of documents and W$_{ij}$$^d$ includes text of a d$^{th}$ message exchanged between the node i and the node j, the method comprising:
 1) a first step of initially clustering all the number M of nodes into a predetermined number Q of clusters, for determining a first estimated clustering Y=(Y$_1$, Y$_2$. . . ,Y$_M$);
 2) a second step of inference of a generative model, wherein edges A$_{ij}$ are modeled with a Stochastic Block Model (SBM) and, conditionally to an estimated clustering Y, the set of documents W$_{ij}$$^d$ between and within the clusters are modeled according to a generative model of documents,
 the second step of inference comprising the following sub-steps:
  a. for a cluster q, determining from the first estimated clustering Y, an estimated proportion ρ$_q$ of the cluster q, an estimated probability π$_{qr}$ that a first node included in the cluster q and a second node included in a cluster r are associated with text data in the communications network;
  b. determining from the first estimated clustering Y, an estimated distribution R(Z,θ), and an estimated probability β, wherein:
   Z$_{ij}$$^{dn}$ is a topic vector indicating a first topic of an n-th word n of the at least one set of documents W$_{ij}$$^d$, wherein W$_{ij}$$^{dn}$ corresponds to the n-th word of a d-th document;
   θ$_{qr}$ is a vector of topic proportions, wherein θ$_{qrk}$ is an estimated probability of a topic k of text data associated between the cluster q and the cluster r,
   β$_{kv}$ is a probability of each word v of a dictionary being used in the topic k;
  the sub-step b comprising the following sub-steps:
   b1. for each cluster q, aggregating the at least one set of documents W$_{ij}$$^d$ associated with each of a pairs of nodes (i,j) that are both within the cluster q, so as to produce a first aggregate of text data associated with the cluster q,
   and for each cluster q, aggregating the at least one set of documents W$_{ij}$$^d$ associated with each of the pairs of nodes (i, j), in which the nodes i belongs to the cluster q and the node j belongs to the cluster r, so as to produce at least one second aggregate associated to a pair of clusters (q,r),
   b2. processing the first and second aggregates to determine the topics k corresponding to text data of the first and second aggregates, with a predetermined number K of topics being determined, and
   b3. processing the text data of the first and second aggregates to determine a distribution R(Z,θ) and a probability β;
   b4. iteratively repeating sub-steps b1, b2 and b3 of the second step 2);
  c. calculating a new estimated clustering Y of the nodes in Q clusters, in accordance with calculated probabilities β, ρ, π and the estimated distribution R(Z,θ) of the sub-steps a and b of the second step 2),
  by determining, for each node i of the communications network, which optimal cluster provides a maximum value of a statistical criterion when each node i is assigned to said cluster, and assigning at least one node i to the determined optimal cluster;
 3) a third step in which the second step 2) is repeated, with the new estimated clustering Y calculated in sub-step c and injected in the step 2), until a convergence criterion is fulfilled for determining and outputting a final clustering Y, at least one final proportions $\rho_q$, a final distribution $R(Z,\theta)$, at least one final probability $\pi_{qr}$, and at least one final probability $\beta_{kv}$.

2. The method of claim 1, wherein in the generative model of documents, the modeling of the edge $A_{ij}$ leads to the following joint distribution:

$$p(A, Y \mid \rho, \pi) = p(A \mid Y, \pi)p(Y \mid \rho),$$

where $$p(A \mid Y, \pi) = \prod_{i \neq j}^{M} p(A_{ij} \mid Y_i, Y_j, \pi),$$

$$= \prod_{i \neq j}^{M} \prod_{q,r}^{Q} p(A_{ij} \mid \pi_{qr})^{Y_{iq}Y_{jr}},$$

and $$p(Y \mid \rho) = \prod_{i=1}^{M} p(Y_i \mid \rho)$$

$$= \prod_{i=1}^{M} \prod_{q=1}^{Q} \rho_q^{Y_{iq}}$$

and the probability of presence of an edge $A_{ij}$ between two nodes i and j, i being in the cluster q and j being in the cluster r, is only a function of the connection probability $\pi_{qr}$ between the clusters q and r.

3. The method of claim 2, wherein in the generative model, the modeling of the at least one set of documents $W_{ij}^d$ leads to the following joint distribution:

$$p(W, Z, \theta \mid A, Y, \beta) = p(W \mid A, Z, \beta)\rho(Z \mid A, Y, \theta)p(\theta)$$

$$= \prod_{i \neq j}^{M} \left\{ \prod_{d=1}^{D_{ij}} \prod_{n=1}^{N_{ij}^d} \prod_{k=1}^{K} p(W_{ij}^{dn} \mid \beta_k)^{Z_{ij}^{dnk}} \right\}^{A_{ij}} \times$$

$$\prod_{i \neq j}^{M} \left\{ \prod_{d=1}^{D_{ij}} \prod_{a=1}^{N_{ij}^d} \prod_{q,r}^{Q} p(Z_{ij}^{dn} \mid \theta_{qr})^{Y_{iq}Y_{jr}} \right\}^{A_{ii}}$$

$$\prod_{q,r}^{Q} Dir(\theta_{qr}; \alpha).$$

wherein $\beta_k$ is an initial topic vector, a latent topic vector $Z_{ij}^{dn}$ of the n-th word $W_{ij}^{dn}$ follows a multinomial distribution whose parameters are only a function of q and r, the vectors of topic proportions $\theta_{qr}$ are drawn from a Dirichlet distribution having a parameter $\alpha>0$, indicating a predominance of a plurality of topics over all pairs of clusters, and the word $W_{ij}^{dn}$, given the topic vector $Z_{ij}^{dn}$ of said word and for a given topic k of said topic vector, is drawn from a multinomial distribution whose parameters are only a function of topic k.

4. The method of claim 2, wherein a complete data log likelihood of the generative model is:

$$\log p(A, W, Y \mid \rho, \pi, \beta) = \log \sum_{Z} \int_{\theta} p(A, W, Y, Z, \theta \mid \rho, \pi, \beta)d\theta,$$

and an inference allows to maximize a decomposition function of the complete data log likelihood with the following lower bound:

$$\log p(A, W, Y \mid \rho, \pi, \beta) = \tag{6}$$
$$\mathcal{L}(R(\cdot); Y, \rho, \pi, \beta) + KL(R(\cdot) \| p(\cdot \mid A, W, Y, \rho, \pi, \beta)),$$

where $$\mathcal{L}(R(\cdot); Y, \rho, \pi, \beta) =$$

$$\sum_{Z} \int_{\theta} R(Z, \theta)x \times \log \frac{p(A, W, Y, Z, \theta \mid \rho, \pi, \beta)}{R(Z, \theta)} d\theta,$$

and KL denotes the Kullback-Leibler divergence between the true and approximate posterior distribution R (•) of (Z, $\theta$), given the data and model parameters.

5. The method of claim 4, further comprising a sub-step d) of the second step, wherein the sub-step d) comprises, for calculating the new estimated clustering Y:
   a1. for the node i of the communications network, calculating a value of a lower bound L with a first estimated node clustering $Y_i$, being considered in each cluster q, a second estimated node clustering $Y_j$ of the nodes j of the communications network being fixed,
   determining the estimated clustering $Y_i$, in which the lower bound L is a maximum, and storing a new estimated node clustering $Y_i$, in a new estimated clustering Y,
   a2. repeating sub-step a1, for each node i=1, . . . ,M, for obtaining the new estimated clustering Y.

6. The method of claim 4, wherein the sub-step b4 is iterated with a variational expectation-maximization algorithm (VEM-algorithm), and the sub-step c is implemented with a Classification-VEM algorithm.

7. The method of claim 5, wherein for the sub-steps a and b of the second step 2), the estimated probabilities $\pi$, $\beta$, $\rho$ are given by maximizing the lower bound L, and are:

$$\beta_{kv} \propto \sum_{i \neq j}^{M} A_{ij} \sum_{d=1}^{D_{ij}} \sum_{n=1}^{N_{ij}^{dn}} \phi_{ij}^{dnk} W_{ij}^{dnv}, \forall (k, v),$$

$$\rho_q \propto \sum_{i=1}^{M} Y_{iq}, \forall q, \pi_{qr} = \frac{\sum_{i \neq j}^{M} Y_{iq} Y_{jr} A_{ij}}{\sum_{i \neq j}^{M} Y_{iq} Y_{jr}}, \forall (q, r).$$

8. The method of claim 1, wherein the first step 1) comprises:
   determining initial topics, by analyzing co-occurrence of words throughout the text data, with a variational expectation-maximization (VEM) for Latent Dirichlet Allocation (LDA), on each of the least one set of documents $W_{ij}^d$;
   calculating a topic matrix X comprising a plurality of topic matrix values each associated to a pair of nodes, wherein each of the topic matrix values corresponds to a major topic found in text data associated with the pair of nodes, calculating a distance matrix, wherein Δ represents the distance matrix, the distance matrix Δ comprising a plurality of distance values each associated to a pair of nodes, wherein a distance value between nodes of the pair is calculated as follows:

$$\Delta(i, j) = \sum_{h=1}^{N} \delta(X_{ih} \neq X_{jh})A_{ih}A_{jh} + \sum_{h=1}^{N} \delta(X_{hi} \neq X_{hj})A_{hi}A_{hj},$$

performing a k-means clustering from said distance matrix Δ in order to obtain the clusters of first step 1).

9. The method of claim 1, further comprising pre-processing received text data before sub-step b2 of the second step 2), wherein the pre-processing comprises at least one of:
deleting a word of the text data shorter than a predetermined word length,
deleting a word of the text data part of a predetermined list of stopwords,
deleting non-alphabetic characters in the text data,
detecting in the text data a plurality of words having a common root, or
selecting a reference word in the plurality of words, and replacing at least one word of said plurality of words by the reference word.

10. The method of claim 5, wherein the convergence criterion of the third step 3) is fulfilled whenever a difference in absolute value between the lower bound value for the current iteration of third step 3) and a previously obtained lower bound value for a previous iteration of third step 3), is below a predetermined threshold.

11. The method of claim 1, wherein the communications network is a telecommunication network, a computer network, the internet, a telephone network, or a TCP/IP network.

12. The method of claim 11, wherein when the communications network is an email communication network, each node being one email address, and the at least one set of documents $W_{ij}^d$ associated with the nodes i,j are emails sent in the communications network from first email address of the node i to a second email address of the node j.

13. The method of claim 11, wherein the communications network is a Message Service (SMS/MMS) communication network, each node being one mobile phone number, and the at least one set of documents $W_{ij}^d$ associated with two nodes i,j are messages sent in the communications network from a first mobile phone number of the node i to a second mobile phone number of the node j.

14. The method of claim 1, wherein the communications network is a sensors communication network, the seconds communication network being as wireless sensors network, each node being one sensor, and the at least one set of documents $W_{ij}^d$ associated with two nodes i,j are sent in the communications network from a first sensor of the node i to a second sensor of the node j.

15. The method of claim 5, wherein steps 2) to 3) are carried out based on different pairs of fixed parameters (Q, K), the method further comprising:
5) a fifth step of calculating a quality score, based on an Integrated Completed Likelihood (ICU) criterion adapted to the generative model of claim 1,
6) a sixth step of repeating steps 1) to 5) for a plurality of different pairs of numbers (Q, K),
7) a seventh step of selecting, among the plurality different pairs of numbers (Q, K) that have been tested, an optimal pair of numbers (Q*,K*) for which a maximum quality score has been obtained.

16. The method of claim 1, further comprising displaying a visual representation of the communications network, wherein:
a cluster is represented by a vertex having a size depending of the size of the cluster, and
an aggregate is represented by an arrow associated with two vertices, wherein an edge associated with a pair of a first vertex representing a first cluster and a second vertex representing a second cluster has a thickness that depends on a probability that a node included in the first cluster and a node included in the second cluster are associated with a text datum in the communications network.

17. A computer-implemented method for clustering nodes i,j which jointly generates a set of documents or datasets, a communications network comprising a number M of nodes, nodes i,j being associated with edges $A_{ij}$ of an adjacency matrix A,
a document edge $W_{ij}$ of text data by edge $A_{ij}$, the document edge $W_{ij}$ being a vector $W_{ij}=(W_{ij}^1, \ldots, W_{ij}^d, \ldots, W_{ij}^{Dij})$, wherein $D_{ij}$ is a number of documents shared by or resulting of the interaction between the node i and the node j, where $W_{ij}^d$ is at least one set of documents and $W_{ij}^d$ includes text of a $d^{th}$ document shared by or resulting of the interaction between the node i and the node j,
the method comprising steps of:
1) a first step of initially clustering all the number M of nodes into a predetermined number Q of clusters, for determining a first estimated clustering $Y=(Y_1, Y_2, \ldots, Y_M)$;
2) a second step of inference of a generative model, wherein edges $A_{ij}$ are modeled with a Stochastic Block Model (SBM) and, conditionally to an estimated clustering Y, the sets of documents $W_{ij}^d$ between and within the clusters are modeled according to a generative model of documents,
the second step of inference comprising the following sub-steps:
a. for a cluster q, determining from the first estimated clustering Y, an estimated proportion $\rho_q$ of each cluster q, an estimated probability $\pi_{qr}$ that a first node included in the cluster q and a second node included in a cluster r are associated with text data in the communications network;
b. determining from the first estimated clustering Y, an estimated distribution R (Z,θ), and an estimated probability β, with:
$Z_{ij}^{dn}$ is a topic vector indicating a fist topic of the n-th word n of the at least one set of documents $W_{ij}^d$, wherein $W_{ij}^{dn}$,
$θ_{qr}$ is a vector of topic proportions, wherein $θ_{qrk}$ is an estimated probability of a topic k of text data associated between the cluster q and the cluster r, making for a vector of topic proportions $θ_{qr}$,
βkv is a probability of each word v of dictionary being used in the topic k;
the sub-step b) comprising the following sub-steps:
b1. for each cluster q, aggregating the at least one set of documents $W_{ij}^d$ of text data associated with all the pair of nodes (i,j) within the cluster q, so as to produce a first aggregate of text data associated with the cluster q,
and for each cluster q, aggregating the at least one set of documents $W_{ij}^d$ associated with all the pair of nodes (i, j), from which the nodes i belongs to the cluster q and the node j belongs to the cluster r, so as to produce at least one second aggregate associated to a pair of clusters (q,r), b2. processing the first and second aggregates to determine the topics k corresponding to text data of the first and second aggregates, with a predetermined number K of topics being determined, and b3. processing the text data of the first and second aggregates to determine a distribution $R(Z,\theta)$ and a probability $\beta$;

b4. iteratively repeating sub-step b1, b2 and b3 of second step 2);

c. calculating a new estimated clustering Y of the nodes into Q clusters, in accordance with calculated probabilities $\beta$, $\rho$, $\pi$ and the estimated distribution $R(Z,\theta)$ of the sub-steps a and b of the second step, by determining, for each node i of the communications network, which optimal cluster provides a maximum value of a statistical criterion when each node i is assigned to said cluster, and assigning at least one node i to the determined optimal cluster;

3) a third step in which the second step 2) is repeated, with the new estimated clustering Y calculated in sub-step c and injected in the step 2), until a convergence criterion is fulfilled for determining and outputting a final clustering Y, a final proportion $\rho_q$, a final distribution $R(Z,\theta)$, at least one final probability $\pi_{qr}$, and a final probability $\beta kv$.

18. The method of claim 17, wherein in the generative model, the modeling of the edge $A_{ij}$ leads to the following joint distribution:

$$p(A, Y \mid \rho, \pi) = p(A \mid Y, \pi)p(Y \mid \rho),$$

where $$p(A \mid Y, \pi) = \prod_{i \neq j}^{M} p(A_{ij} \mid Y_i, Y_j, \pi)$$

$$= \prod_{i \neq j}^{M} \prod_{q,l}^{Q} p(A_{ij} \mid \pi_{qr})^{Y_{iq}Y_{jr}},$$

and $$p(Y \mid \rho) = \prod_{i=1}^{M} p(Y_i \mid \rho)$$

$$= \prod_{i=1}^{M} \prod_{q=1}^{Q} \rho_q^{Y_{iq}}.$$

and the probability of presence of an edge $A_{ij}$ between two nodes i and j, i being in the cluster q and j being in the cluster r, is only a function of the connection probability $\pi_{qr}$ between the cluster q and r.

19. The method of claim 18, wherein in the generative model, the modeling of the at least one set of documents $W_{ij}^d$ leads to the following joint distribution:

$$p(W, Z, \theta \mid A, Y, \beta) = p(W \mid A, Z, \beta)\rho(Z \mid A, Y, \theta)p(\theta)$$

$$= \prod_{i \neq j}^{M} \left\{ \prod_{d=1}^{D_{ij}} \prod_{n=1}^{N_{ij}^d} \prod_{k=1}^{K} p(W_{ij}^{dn} \mid \beta_k)^{Z_{ij}^{dnk}} \right\}^{A_{ij}} \times$$

$$\prod_{i \neq j}^{M} \left\{ \prod_{d=1}^{D_{ij}} \prod_{n=1}^{N_{ij}^d} \prod_{q,r}^{Q} p(Z_{ij}^{dn} \mid \theta_{qr})^{Y_{hi}Y_{jr}} \right\}^{A_{ij}}$$

$$\prod_{q,r}^{Q} Dir(\theta_{pr}; \alpha),$$

wherein $\beta_k$ is an initial topic vector, a topic vector $Z_{ij}^{dn}$ of the n-th word $W_{ij}^{dn}$ follows a multinomial distribution whose parameters are only a function of q and r, the vectors of topic proportions $\theta_{qr}$ are drawn from a Dirichlet distribution having a parameter $\alpha > 0$, indicating a predominance of a plurality of topics over all pairs of clusters, and the word $W_{ij}^{dn}$ given the topic vector $Z_{ij}^{dn}$ of said word and for a given topic k of said topic vector, is drawn from a multinomial distribution whose parameters are only a function of topic k.

20. The method of claim 18, wherein a complete data log likelihood of the generative model is:

$$\log p(A, W, Y \mid \rho, \pi, \beta) = \log \sum_{Z} \int_{\theta} p(A, W, Y, \theta \mid \rho, \pi, \beta)d\theta,$$

and an inference allows to maximize a decomposition function of the complete data log likelihood with the following lower bound:

$$\log p(A, W, Y \mid \rho, \pi, \beta) = \qquad (6)$$
$$\mathcal{L}(R(\cdot); Y, \rho, \pi, \beta) + KL(R(\cdot) \| p(\cdot \mid A, W, Y, \rho, \pi, \beta)),$$

where $$\mathcal{L}(R(\cdot); Y, \rho, \pi, \beta) =$$
$$\sum_{Z} \int_{\theta} R(Z, \theta) x \times \log \frac{p(A, W, Y, Z, \theta \mid \rho, \pi, \beta)}{R(Z, \theta)} d\theta,$$

and KL denotes the Kullback-Leibler divergence between the true and approximate posterior distribution $R(\bullet)$ of $(Z,\theta)$, given the data and model parameters.

21. The method of claim 20, further comprising a step d) of the second step, wherein the step d) comprises, for calculating the new estimated clustering Y:

a1. for the node i of the network, calculating a value of a lower bound $L_q$ with a first estimated node clustering $Y_i$, i being considered in each cluster q, a second estimated node clustering $Y_j$ of the nodes j of the communications network being fixed, determining the estimated clustering Yi in which the lower bound $L_q$ is maximum, and storing a new estimated node clustering $Y_i$, in a new estimated clustering Y, a2. repeating sub-step a.1, for each node i=1, ..., m, for obtaining the new estimated clustering Y.

22. The method of claim 17, wherein the set is a co-authorship documents set, the nodes are at least one author or at least one groups of authors, and the at least one set of documents $W_{ij}^d$ of text data associated with two nodes (i,j) is co-written by the two nodes (i,j).

23. The method of claim 17, wherein when the set of documents is a set of written documents, the nodes are at least one persons or at least one groups of persons, and the set of documents $W_{ij}^d$ associated with two nodes (i,j) includes a name of the at least one person or at least one group of persons corresponding to the two nodes (i,j).

24. The method of claim 23, wherein the at least one person is a physical person or a corporation.

25. A non-transitory computer-readable storage device storing instructions executable by a processor for performing the method of clustering nodes of a communication network, the communications network comprising a number M of nodes, nodes i,j being associated with edges $A_{ij}$ of an adjacency matrix A, a message edge $W_{ij}$ of text data by edge $A_{ij}$, the message edge $W_{ij}$ being a vector $W_{ij}=(W_{ij}^1, \ldots, W_{ij}^d, \ldots, W_{ij}^{D_{ij}})$, wherein $D_{ij}$ is a number of text documents exchanged between the node i and the node j, where $W_{ij}^d$ is at least one set of documents and $W_{ij}^d$ includes text of a $d^{th}$ message exchanged between the node i and the node j, the method comprising:
1) initially clustering all the number M of nodes into clusters, for determining a first estimated clustering $Y=(Y_1, Y_2, \ldots, Y_M)$;
2) a second step of inference of the generative model, wherein edges $A_{ij}$ are modeled with a Stochastic Block Model (SBM) and, conditionally to the an estimated clustering Y, the sets of documents $W_{ij}^d$ between and within clusters are modeled according to a generative model, the second step of inference comprising the following sub-steps:
a. for a cluster q, determining from the first estimated clustering Y, an estimated proportion $\rho_q$ of the cluster q, an estimated probability $\pi_{qr}$ that a first node included in the cluster q and a second node included in a cluster r are associated with text data in the communications network;
b. determining from the first estimated clustering Y, an estimated distribution $R(Z,\theta)$, and an estimated probability $\beta$, wherein:
$Z_{ij}^{dn}$ is a topic vector indicating a first topic of the an n-th word n of the at least one set of documents $W_{ij}^d$, wherein $W_{ij}^{dn}$ corresponds to the n-th word of a d-th document, $\theta_{qr}$ being a vector of topic proportions, wherein $\theta_{qrk}$ is an estimated probability of a topic k of text data associated between the cluster q and the cluster r,
$\beta_{kv}$ a probability of each word v of dictionary being used in the topic k;
the sub-step b. comprising the following sub-steps:
b1. in the generative model, for each cluster q, aggregating the at least one set of documents $W_{ij}^d$ associated with each of a pair of nodes (i,j) that are both within the cluster q, so as to produce a first aggregate of text data associated with the cluster q,
and for each cluster q, aggregating the at least one set of documents $W_{ij}^d$ associated with each of the pairs of nodes (i,j), in which the node i belongs to the cluster q and the node j belongs to the cluster r, so as to produce at least one second aggregate associated to a pair of clusters (q,r),
b2. in the generative model, processing the first and second aggregates to determine the topic k corresponding to text data of the first and second aggregates, and
b3. processing the text data of the first and second aggregates to determine a distribution $R(Z,\theta)$ and a probability $\beta$;
b4. iteratively repeating sub-step b1, b2, b3 of the second step 2);
c. calculating a new estimated clustering Y, in accordance with calculated probabilities $\beta$, $\rho$, $\pi$ and the estimated distribution $R(Z,\theta)$ of the sub-steps a and b of the second step,
by determining, for each node i of the communications network, which optimal cluster provides a maximum value of a statistical criterion when each node i is assigned to a cluster q, and assigning each node i to the determined optimal cluster;
3) a third step in which the second step 2) is repeated, with the new estimated clustering Y calculated in sub-step c and injected in the step 2), until a convergence criterion is fulfilled for determining and outputting a final clustering Y, at least one final proportions $\rho_q$, a final distribution $R(Z,\theta)$, at least one final probability $\pi_{qr}$, and at least one final probability $\beta_{kv}$.

* * * * *